United States Patent
Fukunaga et al.

(10) Patent No.: US 9,079,491 B2
(45) Date of Patent: Jul. 14, 2015

(54) WORK VEHICLE

(71) Applicant: Kubota Corporation, Osaka-shi (JP)

(72) Inventors: Tomofumi Fukunaga, Sakai (JP); Kenichi Aoyama, Sakai (JP); Isao Shibahara, Sakai (JP); Shinji Yamamoto, Sakai (JP); Kazuya Tamaki, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 14/024,435

(22) Filed: Sep. 11, 2013

(65) Prior Publication Data

US 2014/0290399 A1    Oct. 2, 2014

(30) Foreign Application Priority Data

| Mar. 28, 2013 | (JP) | ................................. | 2013-070588 |
| Mar. 28, 2013 | (JP) | ................................. | 2013-070589 |
| Mar. 28, 2013 | (JP) | ................................. | 2013-070590 |

(51) Int. Cl.

| *F16H 37/00* | (2006.01) |
| *B60K 17/28* | (2006.01) |
| *F16H 57/02* | (2012.01) |
| *F16H 57/037* | (2012.01) |
| *F16H 57/021* | (2012.01) |

(52) U.S. Cl.
CPC ............... *B60K 17/28* (2013.01); *F16H 57/02* (2013.01); *F16H 57/037* (2013.01); *F16H 2057/0216* (2013.01); *F16H 2200/0004* (2013.01)

(58) Field of Classification Search
USPC ........... 180/53.61, 53.62, 53.7; 74/15.2, 15.4, 74/15.6, 15.66, 15.82, 15.84, 15.86, 15.88
See application file for complete search history.

(56) References Cited

U.S. PATENT DOCUMENTS

| 6,830,116 | B2 * | 12/2004 | Ishimaru et al. | ............. 180/53.4 |
| 7,140,457 | B2 * | 11/2006 | Ishimaru et al. | ............. 180/53.4 |
| 7,404,341 | B2 * | 7/2008 | Nishino et al. | .................. 74/331 |
| 7,421,917 | B2 * | 9/2008 | Nishino et al. | .................... 74/11 |
| 7,484,580 | B2 * | 2/2009 | Yamaguchi et al. | ......... 180/53.6 |
| 8,322,240 | B2 * | 12/2012 | Tsuji | ................................. 74/11 |
| 2004/0244514 | A1 * | 12/2004 | Kajino et al. | .................. 74/15.4 |
| 2010/0242637 | A1 * | 9/2010 | Inamori et al. | ............... 74/15.86 |
| 2014/0076073 | A1 * | 3/2014 | Kiyokawa et al. | ............. 74/15.2 |

FOREIGN PATENT DOCUMENTS

| JP | 6129 U | 1/1986 |
| JP | 6297978 A | 10/1994 |
| JP | 200354275 A | 2/2003 |
| JP | 200354283 A | 2/2003 |

(Continued)

*Primary Examiner* — Toan To

(74) *Attorney, Agent, or Firm* — The Webb Law Firm

(57) ABSTRACT

A power transmission apparatus for a work vehicle comprises a speed change device for shifting power from an engine and transmitting the power to a propelling line, a forward/reverse drive switching device for switching power from the engine between forward drive and reverse drive, a PTO shaft for taking off working power, a working transmission line for transmitting power from the engine to the PTO shaft, a clutch element for establishing and breaking power transmission from the engine to the PTO shaft, and a transmission case. The transmission case includes a first housing space for housing the speed change device, and a second housing space defined rearward of the first housing space for housing the forward/reverse drive switching device. The clutch element is housed in the first housing space.

9 Claims, 13 Drawing Sheets

(56) References Cited

FOREIGN PATENT DOCUMENTS

| | | | |
|---|---|---|---|
| JP | 200354284 A | 2/2003 |
| JP | 200682645 A | 3/2006 |
| JP | 2011131646 A | 7/2011 |
| KR | 20030014648 A | 2/2003 |

* cited by examiner

WORK VEHICLE

CROSS-REFERENCE TO RELATED APPLICATION

This application claims priority to Japanese Patent Application Nos. 2013-070588, 2013-070589, and 2013-070590, filed Mar. 28, 2013, the disclosures of which are hereby incorporated in their entirety by reference.

TECHNICAL FILED OF INVENTION

The present invention relates to a work vehicle.

RELATED ART OF INVENTION

The work vehicle may include a power transmission apparatus mounted on a PTO transmission line for transmitting power to a PTO shaft and having a one-way clutch for allowing prior rotation of a driven element. One example of such a conventional power transmission apparatuses for the work vehicle includes a drive shaft and a driven shaft arranged one behind the other in a fore-and-aft direction close to each other with their rotational centers being aligned, in which the one-way clutch has one claw element that is spline fitted on a rear end of the drive shaft to be slidable, the other claw element that is spline fitted on a front end of the driven shaft to be slidable, and a spring for urging to mesh the one claw element with the other claw element for allowing the driven shaft to rotate ahead of the drive shaft by linking a control lever switchable and maintainable in position to the other claw clutch. With the action of the one-way clutch, it is intended to avoid a disadvantage that the vehicle speed is not lowered due to rotation of the drive shaft in the reverse drive state along with the driven shaft interlocking with the PTO shaft by the inertia of a work implement even when deceleration operation is performed by an acceleration pedal during the travel of the work vehicle with the work implement being actuated with power that is taken off from the PTO shaft, for example. Further, the one-way clutch is intended to be also used as a PTO clutch (see Japanese Unexamined Patent Application Publication No. 6-297978).

Alternatively, the above-described work vehicle may include the power transmission apparatus provided with a first interlock shaft having a first interlock section for operative connection, and a second interlock shaft having a second interlock section for operative connection. Such a power transmission apparatus is mounted on the PTO transmission line for transmitting power to the PTO shaft, for example, and is configured to transmit power from an engine to the PTO shaft through the first interlock shaft and the second interlock shaft (see Japanese Unexamined Patent Application Publication No. 2006-82645 and Japanese Utility Model Publication No. 61-249, for example).

In the power transmission apparatus disclosed in Japanese Unexamined Patent Application Publication No. 2006-82645, a transmission shaft acting as the first interlock shaft is arranged parallel with an input shaft for receiving power from the engine. The PTO shaft is connected to a rear end of the transmission shaft through a coupling, for example. The transmission shaft acting as the first interlock shaft is rotatably supported to shaft supports through bearing elements at a front end and an intermediate portion thereof. It is also disclosed that a relay transmission shaft is operatively connected to a rear end of the transmission shaft and is rotatably supported to a shaft support through a bearing element, and the PTO shaft is connected to a rear end of the relay transmission shaft through a coupling, for example.

The power transmission apparatus disclosed in Japanese Utility Model Publication No. 61-249 includes a PTO shift shaft acting as the first interlock shaft, and an output transmission shaft acting as the second interlock shaft. The PTO shift shaft and the output transmission shaft are arranged adjacent to each other in the axial direction with their rotational centers being aligned. While the PTO shift shaft receives power from a main shaft directly connected to the engine at the first interlock section to be rotatably driven, the output transmission shaft receives power from the PTO shift shaft at the second interlock section to be rotatably driven, thereby to eventually transmit the rotational drive to the PTO shaft. While the PTO shift shaft has axial opposite ends that are rotatably supported to shaft supports through bearing elements, the output transmission shaft also has axial opposite ends that are rotatably supported to shaft supports through bearing elements. A PTO hydraulic clutch device is provided between the PTO shift shaft and the output transmission shaft to be switchable between an engaged position for transmitting power from the PTO shift shaft to the output transmission shaft to rotate the PTO shaft and a disengaged position for shutting off the power transmission from the PTO shift shaft to the output transmission shaft.

Further, the above-described work vehicle may have a support extending upright from a front part of a housing frame for supporting the control lever projecting upward, and a link mechanism for linking the control lever to an input section provided rearward of the housing frame to input an operational force from the control lever to the input section.

One example of the above-described work vehicle is disclosed in Japanese Unexamined Patent Application Publication No. 2011-131646, in which the support extends upright from the front part of the housing frame for supporting the control lever (corresponding to a "forward/reverse drive switching lever" in this publication) projecting upward. The work vehicle also includes the link mechanism for linking the control lever to the input section provided rearward of the housing frame to input the operational force from the control lever to the input section.

The link mechanism disclosed in Japanese Unexamined Patent Application Publication No. 2011-131646 has a downward extension (corresponding to a "pivotal shaft" in this publication) connected to the control lever and extending vertically, and a different extension connected to the downward extension and linked to a switching control link element provided in a side surface in a rear part of the housing frame. The different extension is formed by bending a lower end of the downward extension in L-shape that is in turn inserted into a side surface of the support to extend to the outside of the support. Then, the different extension passes the side of the support and the housing frame to extend rearward to be exposed to the outside and is linked to the input section.

SUMMARY OF INVENTION

With the arrangement disclosed in Japanese Unexamined Patent Application Publication No. 6-297978, the one-way clutch is provided to extend between the drive shaft and the driven shaft arranged one behind the other in the fore-and-aft direction close to each other for allowing the driven shaft to rotate ahead of the drive shaft. Therefore, in order to engage and disengage the one-way clutch smoothly, a centering process is required for aligning the rotational center of the drive shaft with the rotational center of the driven shaft. In addition, it is required to increase an extending length of the rear end of the drive shaft extending from a shaft support for supporting the drive shaft toward the driven shaft in order to allow sliding movement of the claw element and to allow provision of the spring. Meanwhile, it is required to increase an extending length of the front end of the driven shaft extending from a shaft support for supporting the driven shaft toward the drive shaft in order to allow sliding movement of the claw element. Thus, it is difficult to support the one-way clutch extending between the rear end of the drive shaft and the front end of the driven shaft in a stable manner for a long period of time, and there is room for improvement in smoothly engaging and disengaging the one-way clutch that is also used as the PTO clutch and thus used frequently in a stable manner for a long period of time. Hence, it has been desired to provide a work vehicle for engaging and disengaging the one-way clutch in a stable manner for a long period of time while dispensing with the centering process for the transmission shafts.

With the power transmission apparatus disclosed in Japanese Unexamined Patent Application Publication No. 2006-82645, the first interlock shaft is supported at the two positions to the shaft supports through the bearing elements axially spaced apart from each other. With the power transmission apparatus disclosed in Japanese Unexamined Utility Model Publication No. 61-249, both the first interlock shaft and the second interlock shaft are supported at their both ends to the shaft supports through the bearing elements, respectively. In this manner, the first interlock shaft and the second interlock shaft are conventionally supported at two positions to the shaft supports through the bearing elements axially spaced apart from each other.

Consequently, it is required to provide the support structure including the bearings and shaft supports at four positions all told, i.e., two positions in the second interlock shaft axially spaced apart from each other in addition to two positions in the first interlock shaft axially spaced apart from each other, which complicates the support structure. Further, an extra space for such a support structure is necessary. Thus, the support structure for rotatably supporting the first interlock shaft and the second interlock shaft may be not only complicated but also large. In this, it has been desired to provide a work vehicle having a simplified and miniaturized support structure for rotatably supporting the first interlock shaft and the second interlock shaft.

The above-described work vehicle is provided with other elements such as a platform, a boss element for a clutch housing, and a clutch pedal, for example, in the outside of the support element and the housing frame. Thus, in the conventional technique noted above, it is required to provide the link mechanism so as to prevent the portion extending from the side surface of the support element to the outside or the portion exposed to the outside and extending rearward from interfering with the other elements mentioned above. This requires any additional structure for avoiding the interference in providing the link mechanism, which complicates the structure for mounting the link mechanism. An object of the present invention is to provide a work vehicle in which the link mechanism linking the control lever to the input section can be preferably provided so as not to interfere with the other elements.

A power transmission apparatus for a work vehicle according to the present invention comprises a speed change device for shifting power from an engine and transmitting the power to a propelling line, a forward/reverse drive switching device for switching power from the engine between forward drive and reverse drive, a PTO shaft for taking off working power, a working transmission line for transmitting power from the engine to the PTO shaft, a clutch element for establishing and breaking power transmission from the engine to the PTO shaft, and a transmission case including a first housing space for housing the speed change device, and a second housing space defined rearward of the first housing space for housing the forward/reverse drive switching device. The clutch element is housed in the first housing space.

With such a construction, the clutch element for establishing and breaking the power transmission from the engine to the PTO shaft can be preferably housed in the transmission case.

In the above-described arrangement, it is preferable that the clutch element also acts as a one-way clutch for allowing prior rotation of a driven element, and includes a first claw clutch element, a second claw clutch element, and an urging element for urging to return one of the first and second claw clutch elements from a meshing-release position to be out of mesh from the other of the first and second claw clutch elements to a meshing position to be in mesh with the other of the first and second claw clutch elements. The one-way clutch is switchable between and maintainable in an engaged position for allowing one of the first and second claw clutch elements to be in mesh with the other of the first and second claw clutch elements and a disengaged position for preventing the one of the first and second claw clutch elements to be out of mesh from the other of the first and second claw clutch elements. A tubular shaft is fitted on a transmission shaft to be relatively rotatable. One of the first and second claw clutch elements is provided on the transmission shaft and the other of the first and second claw clutch elements is provided on the tubular shaft, thereby to allow the one-way clutch to be mounted on the single transmission shaft.

With such a construction, the one-way clutch can be mounted stably on the single transmission shaft while being also used as the PTO clutch. This can reduce the number of parts in the PTO transmission line. In addition, compared with the conventional arrangement in which the one-way clutch is mounted to extend between the front and rear transmission shafts arranged one behind the other close to each other in the fore-and-aft direction, for example, the one-way clutch that is also used as the PTO clutch and thus used frequently can be engaged or disengaged smoothly in a stable manner for a long period of time while dispensing with the centering process for aligning the rotational centers of the front and rear transmission shafts. As a result, while the simplified construction and the enhancement of the utility in the assembly process are achieved by reducing the number of parts with the one-way clutch being also used as the PTO clutch, the one-way clutch can be reliably engaged or disengaged in a stable manner for a long period of time.

In the above-described arrangement, it is preferable that a transmission gear for taking off working power is mounted on the tubular shaft to be rotatable in unison.

With such a construction, the transmission shaft can be coaxially with and operatively connected to the PTO shaft and can be also used as the PTO shaft. For example, when the transmission gear for taking off working power is mounted on the transmission shaft to be rotatable in unison, it is necessary to transmit power from the tubular shaft fitted on the transmission shaft to the PTO shaft through a relay gear or the like that is rotatable in unison with those shafts. In this, the above arrangement can dispense with such a relay gear. Thus, the simplified construction and the enhancement of the utility in the assembly process are further achieved by reducing the number of parts.

In the above-described arrangement, it is preferable that the second claw clutch element is relatively slidably fitted on the transmission shaft to be rotatable in unison, the tubular shaft is fitted on the transmission shaft to be relatively non-slidable, the first claw clutch element is relatively slidably fitted on the tubular shaft to be rotatable in unison, and the transmission gear is fitted on the tubular shaft to be relatively non-slidable. Here, the urging element is a compression spring that is fitted on the tubular shaft between the first claw clutch element and the transmission gear. The first claw clutch element is configured to be urged to return to the meshing position by the action of the compression spring, and the second claw clutch element is switchable between and maintainable in the engaged position and the disengaged position.

With such a construction, since the transmission gear, the compression spring and the first claw clutch element are fitted on the tubular shaft, those can be fitted on the transmission shaft as a unit of the drive-side transmission section for the PTO transmission line. Thus, the utility in assembling the PTO transmission line can be further enhanced. In this arrangement, while the one-way clutch is formed of the first claw clutch element, the second claw clutch element and the compression spring for allowing the transmission shaft (driven-side) to rotate ahead of the tubular shaft (drive-side), the PTO clutch is formed of the first claw clutch element and the second claw clutch element for establishing and breaking the power transmission from the tubular shaft (drive-side) to the transmission shaft (driven-side).

In the above-described arrangement, it is preferable that the second claw clutch element is relatively slidably fitted on the transmission shaft to be rotatable in unison, and the tubular shaft is fitted on the transmission shaft to be relatively slidable. Further, the first claw clutch element is integrally formed with the transmission gear. The urging element is a compression spring that is fitted on the transmission shaft at a position opposite to the second claw clutch element across the tubular shaft. The first claw clutch element is configured to be urged to return to the meshing position by the action of the compression spring, and the second claw clutch element is switchable between and maintainable in the engaged position and the disengaged position. The transmission gear is configured to maintain a transmission state regardless of whether or not the first claw clutch element slides between the meshing position and the meshing-release position.

With such a construction, since the first claw clutch element and the transmission shaft are integrally formed with the tubular shaft, the number of parts in the PTO transmission line can be reduced, thereby to simplify the construction and enhance the utility in the assembly process. Further, the transmission gear is prevented from releasing the meshing engagement with the drive-side transmission gear when the first claw clutch element slides to the meshing-release position, thereby to avoid a risk that the first claw clutch element slides from the meshing-release position to the meshing position less easily due to the release of the meshing engagement with the drive-side transmission gear by the transmission gear. In this arrangement, while the one-way clutch is formed of the tubular shaft, the transmission gear, the first claw clutch element, the second claw clutch element and the compression spring for allowing the transmission shaft (driven-side) to rotate ahead of the tubular shaft (drive-side), the PTO clutch is formed of the first claw clutch element and the second claw clutch element for establishing and breaking the power transmission from the tubular shaft (drive-side) to the transmission shaft (driven-side).

In the above-described arrangement, it is preferable that the second claw clutch element is relatively non-slidably fitted on the transmission shaft to be rotatable in unison, and the tubular shaft is fitted on the transmission shaft to be relatively slidable. Here, the first claw clutch element is relatively slidably fitted on the tubular shaft to be rotatable in unison, and the transmission shaft is integrally formed with the tubular shaft. The urging element is a compression spring that is fitted on the tubular shaft between the first claw clutch element and the transmission gear. The first claw clutch element is configured to be urged to return to the meshing position by the action of the compression spring, and the first claw clutch element is switchable between and maintainable in the engaged position and the disengaged position. The transmission gear is configured to maintain a transmission state regardless of whether or not the first claw clutch element slides between the engaged position and the disengaged position.

With such a construction, the integral structure of the tubular shaft and the transmission gear can further reduce the number of parts in the PTO transmission line. In addition, since the compression spring and the first claw clutch element are fitted on the tubular shaft, those can be fitted on the transmission shaft as a unit of the drive-side transmission section for the PTO transmission line. Moreover, the transmission gear is prevented from releasing the meshing engagement with the drive-side transmission gear when the first claw clutch element slides to the disengaged position, thereby to avoid a risk that the first claw clutch element slides from the disengaged position to the engaged position less easily due to the release of the meshing engagement with the drive-side transmission gear by the transmission gear. Thus, in addition to the reduction of parts in the PTO transmission line, the structure can be simplified and the utility in the assembly process can be enhanced further. In this arrangement, while the one-way clutch is formed of the first claw clutch element, the second claw clutch element and the compression spring for allowing the transmission shaft (driven-side) to rotate ahead of the tubular shaft (drive-side), the PTO clutch is formed of the tubular shaft, the transmission gear, the compression spring, the first claw clutch element and the second claw clutch element for establishing and breaking the power transmission from the tubular shaft (drive-side) to the transmission shaft (driven-side).

In the above-described arrangement, it is preferable that the working transmission line includes a first interlock shaft having a first interlock section for operative connection, and a second interlock shaft having a second interlock section for operative connection. Here, the first interlock shaft and the second interlock shaft are arranged with their rotational centers being aligned. The first interlock shaft has a first supported end supported to a first shaft support through a first bearing element, and a first non-supported end positioned opposite to the first supported end. The second interlock shaft has a second supported end supported to a second shaft support through a second bearing element, and a second non-supported end positioned opposite to the second supported end. The first non-supported end having a rod shape is inserted into the second non-supported end having a tubular shape through a third bearing element disposed radially between the first non-supported end and the second non-supported end to allow those ends to support with each other and to be relatively rotatable.

With such a construction, in order to rotatably support the first non-supported end of the first interlock shaft and the second non-supported end of the second interlock shaft, it is sufficient to insert the first non-supported end into the second non-supported end and radially dispose the third bearing element therebetween. As a result, while the first non-supported end of the first interlock shaft rotatably supports the second non-supported end of the second interlock shaft through the third bearing element, the second non-supported end of the second interlock shaft rotatably supports the first non-supported end of the first interlock shaft through the third bearing element. In this manner, the first non-supported end and the second non-supported end can support with each other to be relatively rotatable. Thus, while the supporting structure for the first non-supported end of the first interlock shaft can be also used as the supporting structure for the second non-supported end of the second interlock shaft, the first interlock shaft and the second interlock shaft can be supported to be relatively rotatable. Consequently, the structure for supporting the first interlock shaft and the second interlock shaft can be simplified and miniaturized.

In the above-described arrangement, it is preferable that the working transmission line further includes a third interlock shaft arranged parallel with the first interlock shaft and the second interlock shaft, the third interlock shaft having axial opposite ends rotatably supported to third shaft supports through a fourth bearing element. Here, the third interlock shaft is provided with a third interlock gear freely meshed with a first interlock gear acting as the first interlock section in the first interlock shaft, and a fourth interlock gear freely meshed with a second interlock gear acting as the second interlock section in the second interlock shaft.

With such a construction, since the axial opposite ends of the third interlock shaft are rotatably supported to the third shaft supports through the fourth bearing element, the third interlock shaft can be supported at their both ends. Further, the second interlock gear of the second interlock shaft is meshed with the third interlock gear of the third interlock shaft supported at their both ends, which can excert a force to constrain the second interlock shaft radially inward. As a result, the second non-supported end positioned radially outward of the first non-supported end can be constrained radially inward, thereby to easily and stably support the first non-supported end and the second non-supported end. Further, since the third interlock gear of the third interlock shaft is meshed with the first interlock gear of the first interlock shaft, power can be transmitted to the first interlock shaft, the third interlock shaft, and the second interlock shaft in the mentioned order.

In the above-described arrangement, it is preferable that the first interlock shaft and the second interlock shaft are housed in the first housing space, and the clutch element is mounted on the first interlock shaft.

With such a construction, the structure for rotatably supporting the first interlock shaft and the second interlock shaft in the PTO transmission line can be simplified and miniaturized, which in turn can simplify and miniaturize the structure of the PTO transmission line.

A work vehicle according to the present invention comprises a support extending upright from a front part of a housing frame for supporting a control lever projecting upward, a link mechanism for linking the control lever to an input section disposed rearward of the support to input an operation force from the control lever to the input section, and a cover for enveloping the top and opposite lateral sides of the housing frame. The link mechanism includes a downward extension connected to the control lever and extending vertically downward, and a rearward extension connected to a lower end of the downward extension and extending rearward from the front part of the housing frame. The downward extension is disposed inside of the support, and the rearward extension is arranged along the top or one of the lateral sides of the housing frame to be enveloped by the cover.

According to the present invention, the control lever and the input section are linked to each other through the link mechanism to allow an operational force from the control lever to be inputted to the input section disposed rearward of the housing frame. The downward extension of the link mechanism is connected to the control lever to extend vertically downward in the interior of the support. The rearward extension of the link mechanism is connected the lower end of the downward extension to extend rearward from the front part of the housing frame to be enveloped by the cover, and is arranged along the top or one of the lateral sides of the housing frame. Thus, since the support and the cover surround the link mechanism, it is not necessary to consider avoiding the interference with the housing frame or any other elements disposed outside of the support in providing the link mechanism. Further, the link mechanism per se can be protected by being surrounded by the support and the cover.

In the above-described arrangement, it is preferable that the support is opened rearward, and the rearward extension extends from the inside of the support to the outside through the rearward opening of the support.

With such a construction, since the rearward extension of the link mechanism extends from the inside of the support to the outside through the rearward opening of the support, any process for forming a through bore in the support for receiving the link mechanism is dispensable because the rearward opening of the support can be used. Further, compared with the conventional structure in which the link mechanism extends through a side surface of the support, a lateral width space for providing the rearward extension of the link mechanism is saved to arrange the link mechanism in a compact manner.

In the above-described arrangement, it is preferable that the rearward extension extends around a housing frame element provided on the top or in one of the lateral sides of the housing frame and arranged along the top or in one of the lateral sides of the housing frame.

With such a construction, the rearward extension of the link mechanism can be arranged along the top or in one of the lateral sides of the housing frame while avoiding the interference with the housing frame element. As a result, the link mechanism does not excessively bulge outward of the housing frame, and thus can be arranged in a compact manner.

In the above-described arrangement, it is preferable that the work vehicle further comprises a different extending element extending rearward from the front part of the housing frame independently of the rearward extension, wherein the different extending element is arranged along the top or one of the lateral sides of the housing frame to be enveloped by the cover.

With such a construction, the different extending element other than the link mechanism also can be disposed in the space defined between the housing frame and the cover for accommodating the reward extension of the link mechanism. Thus, the space defined between the housing frame and the cover can be effectively used.

In the above-described arrangement, it is preferable that the input section is provided in one of the lateral sides of the housing frame. Here, the rearward extension has a forward region extending along the top of the housing frame, and a rearward region extending rearward from the forward region, the rearward region including a tilting region that inclines relative to the fore-and-aft direction and extends toward the input section.

With such a construction, the link mechanism includes the forward region in the rearward extension extending along the top of the housing frame, and the tilting region inclining relative to the fore-and-aft direction and extending toward the input section in the rearward region extending rearward from the forward region. As a result, compared with the case in which the respective regions of the link mechanism are linked to each other generally perpendicularly without providing the tilting region, the overall length of the link mechanism can be decreased to reduce the cost for manufacturing the link mechanism.

DETAILED DESCRIPTION OF INVENTION

First Embodiment

Embodiments of the present invention will be described hereinafter in reference to the accompanying drawings.

Figure 1:
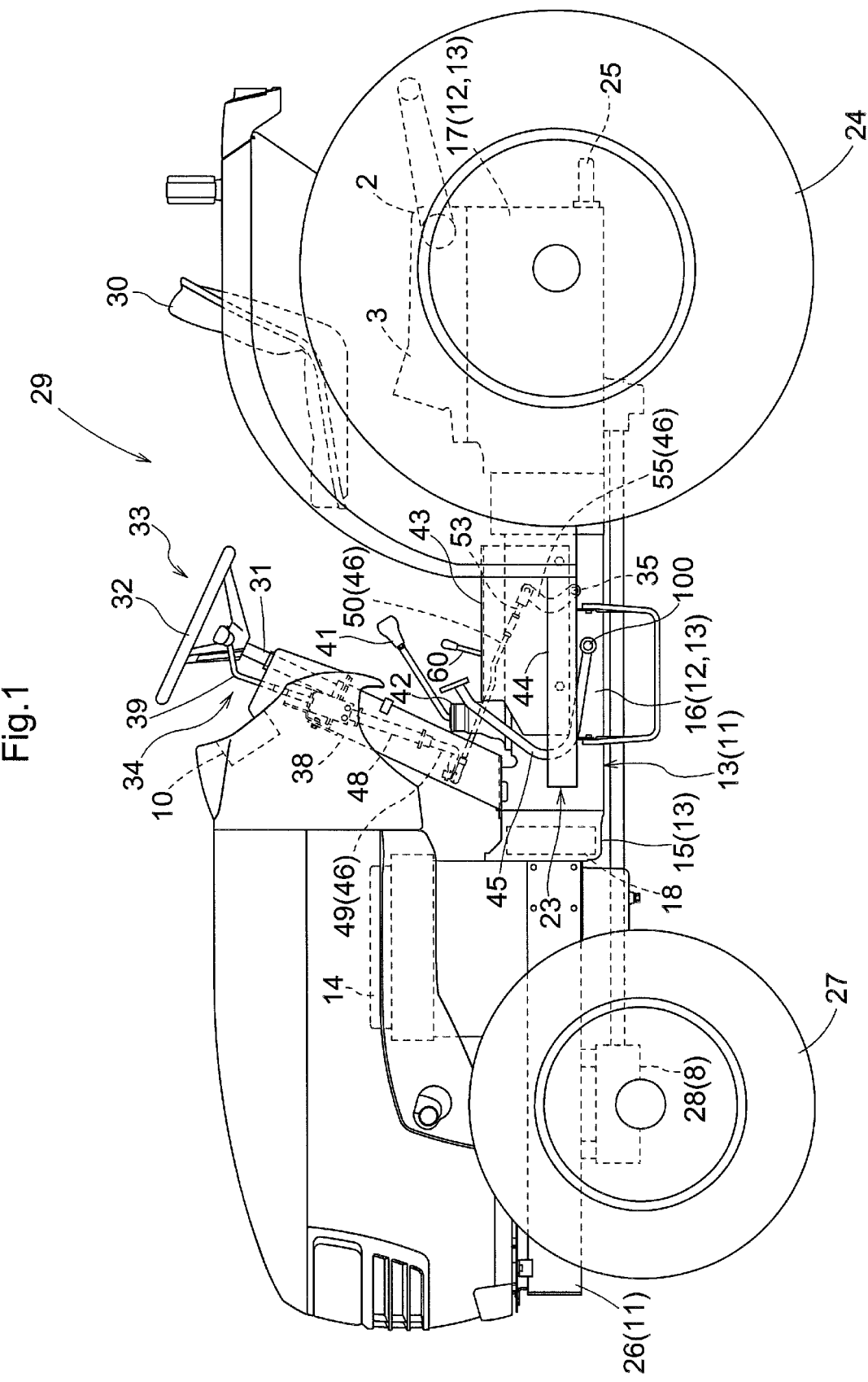
FIG. 1 is a left side view of a tractor.

Referring to FIG. 1, a tractor (an example of a "work vehicle") of the present invention includes a water-cooled engine 14 mounted on a front part of a vehicle frame 11, and a driver's section 29 mounted on a rear part of the vehicle frame 11. The tractor is a four-wheel drive type further including front wheels 27 acting as steerable driven wheels mounted on opposite lateral sides of the engine 14, and rear wheels 24 acting as brakable driven wheels mounted on opposite lateral sides of the driver's section 29.

The vehicle frame 11 is connected to a front frame 26 extending forward from the underside of the engine 14, and to a housing frame 13 extending rearward from the rear underside of the engine 14. The front frame 26 is provided with a rolling front axle case 28 for supporting the right and left front wheels 27 to be driven and steered through a front axle (not shown).

Referring to FIGS. 1 to 5, the driver's section 29 includes a platform 23 made of sheet metal, a driver's seat 30 that is positionally adjustable, a steering wheel 32 for steering the front wheels, and an acceleration pedal for controlling engine speed. The steering wheel 32 is linked to the right and left front wheels 27 through a steering shaft 36 and a power steering mechanism, for example. More particularly, the steering wheel 32, the steering shaft 36 and the power steering mechanism constitute a control device 33 for steering the front wheels. The steering shaft 36 extends through a backward-tilting steering post 31 disposed at a front end portion of the driver's section 29. The steering post 31 stands upright from an upper end of a support 38 that is generally gate-shaped as viewed from the front or the rear and extends upright from the vehicle frame 11 to tilt backward.

As shown in FIG. 1, the housing frame 13 has a three-piece structure dividable into a front case 15, an intermediate case 16 and a rear case 17. The intermediate case 16 and the rear case 17 constitute a transmission case 12. The rear case 17 includes a pair of right and left lift arms 2 for raising and lowering a work implement (not shown) such as a rotary tiller and a plow connected to the rear of the tractor, a hydraulic lift cylinder 3 for vertically pivoting the right and left lift arms 2, and a PTO shaft 25 for taking power for a driven-type work implement such as a rotary tiller connected to the rear of the tractor.

Figure 6:
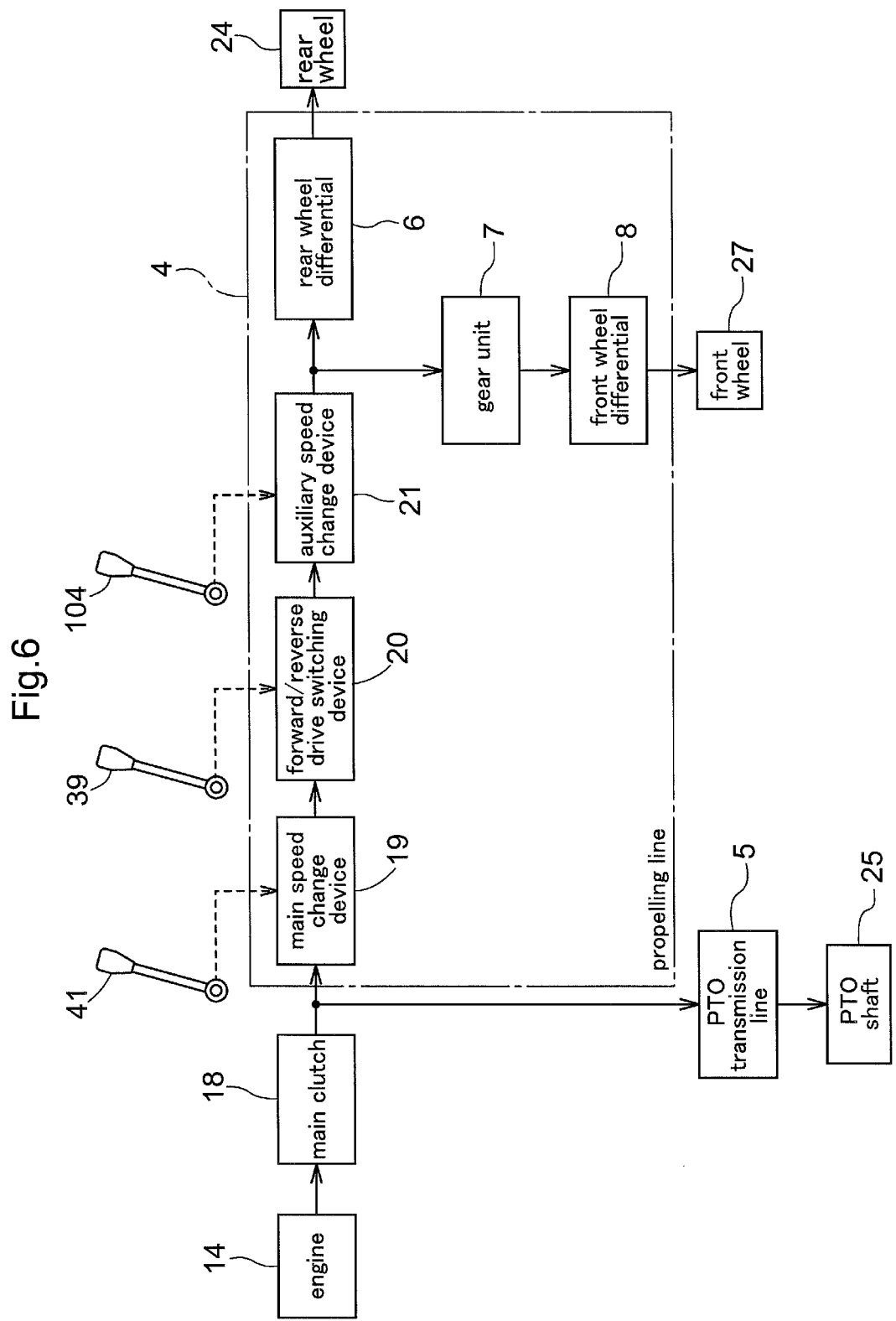
FIG. 6 is a block diagram showing a transmission mechanism for the tractor.

Referring to FIG. 6, power from the engine 14 is distributed to a propelling transmission line 4 and a PTO transmission line 5 via a main clutch 18 having a dry-type single plate clutch. Then, propelling power is transmitted to the right and left front wheels 27 and the right and left rear wheels 24 via the propelling transmission line 4. Working power is transmitted to the PTO shaft 25 via the PTO transmission line 5.

As shown in FIG. 6, the propelling transmission line 4 includes a main speed change device 19 of the sliding-mesh type for shifting power from the engine 14 into four speeds, a forward/reverse drive switching device 20 of the synchromesh type for switching power shifted at the main speed change device 19 between the forward drive and the reverse drive, an auxiliary speed change device 21 of the sliding-mesh type for shifting power switched at the forward/reverse drive switching device 20 into high and low speeds, a rear wheel differential 6 for allowing differential motion of the right and left rear wheels 24 and transmitting power shifted at the auxiliary speed change device 19 to the right and left rear wheels 24, a gear unit 7 for taking power for driving the front wheels from power shifted at the auxiliary speed change device 21, and a front wheel differential 8 for allowing differential motion of the right and left front wheels 27 and transmitting power from the gear unit 7 to the right and left front wheels 27.

Figure 2:
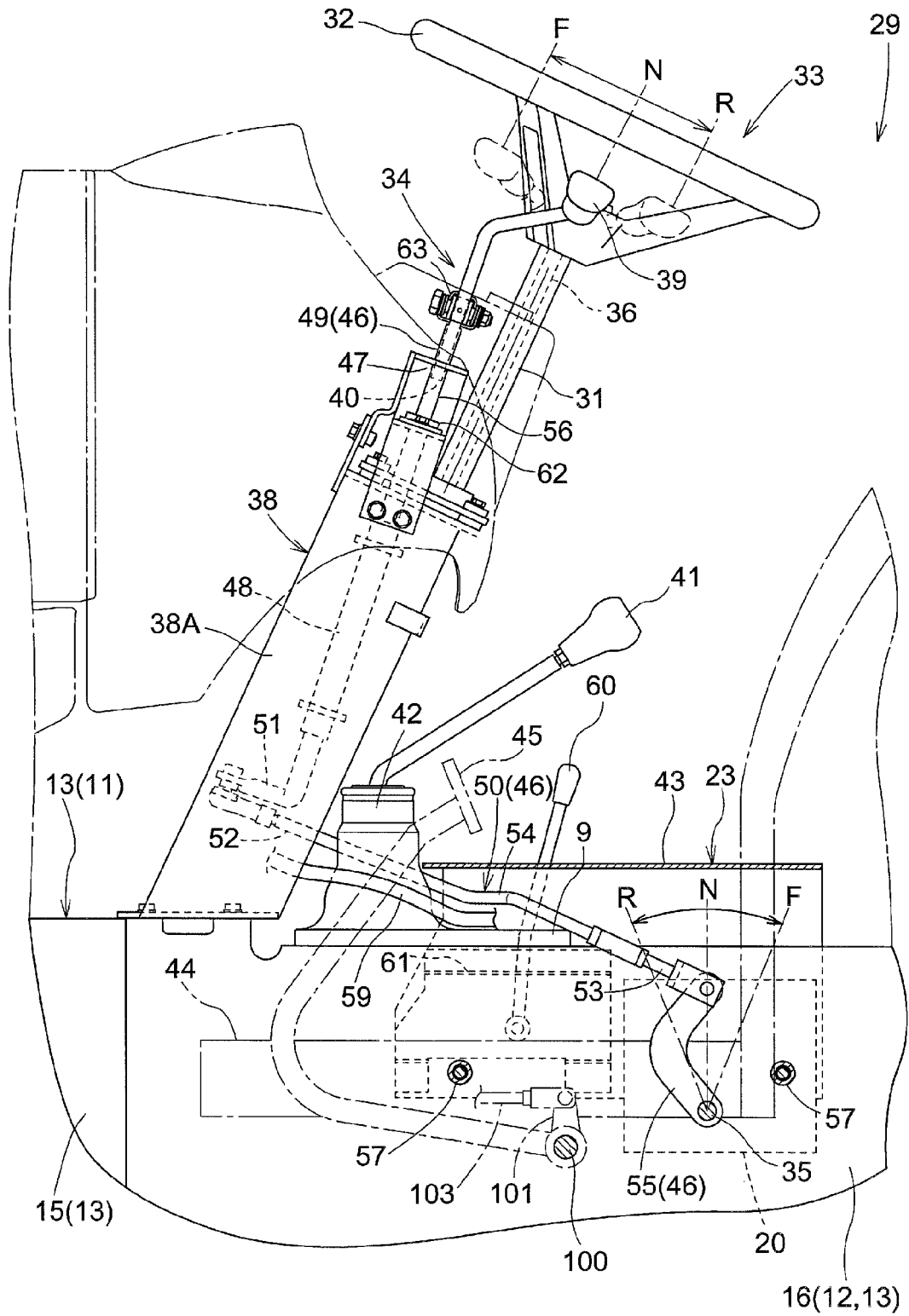
FIG. 2 is a left side view in vertical section of a principal portion including a link mechanism for switching forward/reverse drive.

Referring to FIGS. 1 and 2, the main clutch 18 is configured to switch from an engaged position for transmitting power from the engine 14 to the propelling transmission line 4 to a disengaged position for shutting off the power transmission in response to depression of a clutch pedal 45 provided in a left foot space of the driver's section 29, and switch from the disengaged position to the engaged position in response to release of the depression of the clutch pedal 45.

Figure 3:
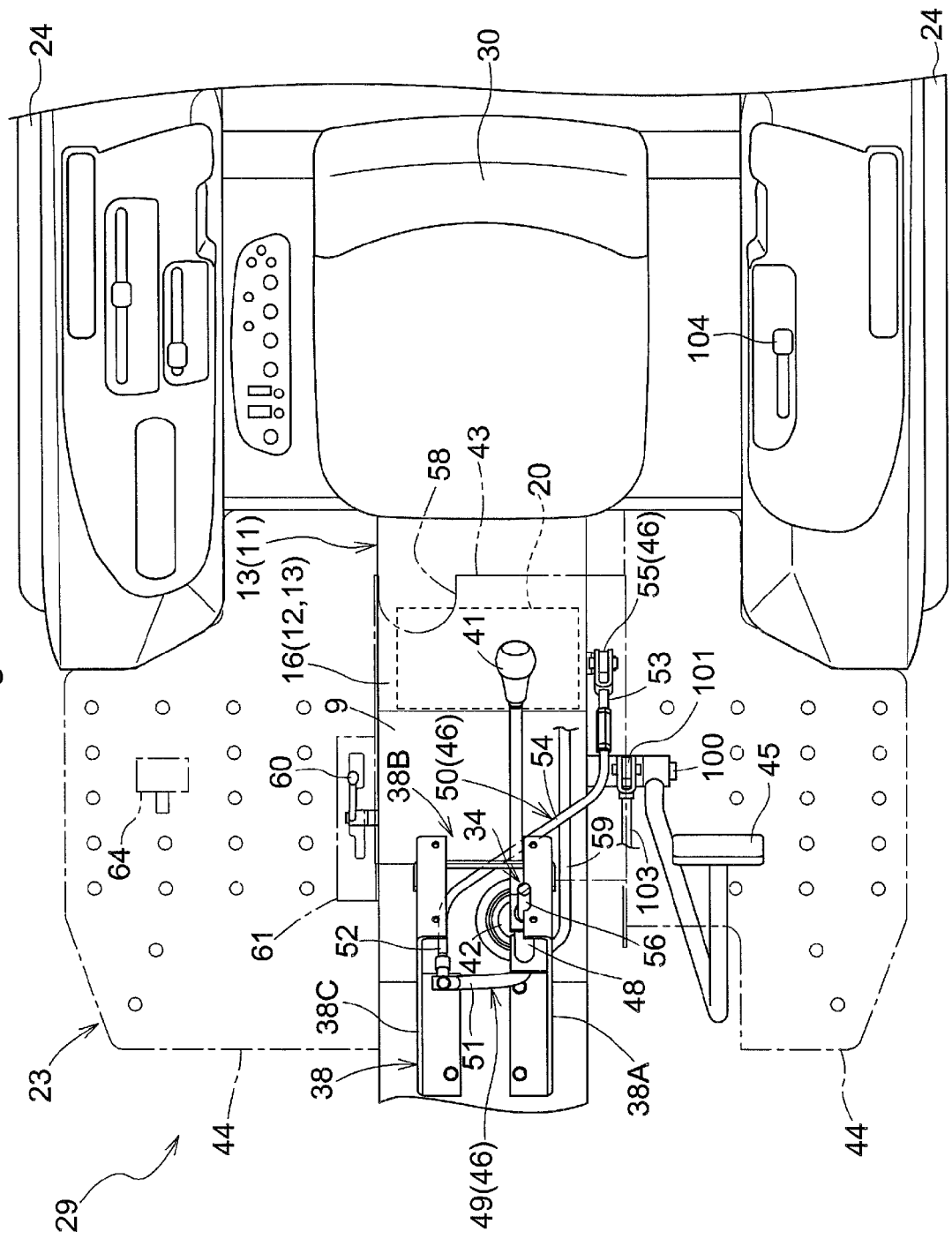
FIG. 3 is a top plan view in horizontal section of the principal portion including the link mechanism for switching forward/reverse drive.

In the interior of the housing frame 13, the front case 15 houses the main clutch 18, the intermediate case 16 houses the main speed change device 19 and the forward/reverse drive switching device 20 arranged from the front to the rear in the mentioned order, and the rear case 17 houses the auxiliary speed change device 21 and the rear wheel differential 6 arranged from the front to the rear in the mentioned order. As shown in FIGS. 3 and 6, the auxiliary speed change device 21 is configured to switch between a low speed transmission state and a high speed transmission state in response to longitudinal pivotal movement of an auxiliary shift lever 104 provided in a side of the driver's seat 30. As illustrated in FIG. 2, a lid 9 is detachably bolted to the top of the intermediate case 16 for opening and closing the intermediate case 16. A lever support 42 (an example of a "housing frame element") bulges upward from a left front end portion of the lid 9 in a transverse central part of the vehicle for pivotably supporting a main shift lever 41 for controlling the main speed change device 19.

Referring to FIGS. 1 to 5, the platform 23 is formed of a main deck 43 made of sheet metal also acting as a cover for enveloping the intermediate case 16 of the transmission case 12 from above, and right and left side decks 44 made of sheet metal laterally extending from the main deck 43. The main deck 43 has a longitudinal length for covering the intermediate case 16 rearward of the lever support 42 from above, and a lateral width greater than that of the intermediate case 16. The main deck 43 is bent to have an inversed U-shape shape as viewed from the front or the rear to cover the top and lateral opposite sides of the housing frame 13. A pair of front and rear cylindrical spacers 57 are welded between an inner surface of a left lower edge portion of the main deck 42 and a left side surface of the intermediate case 16 for securing a gap therebetween. A lever guide 61 made of sheet metal and bent to have a sideways U-shape is welded to a right side surface of the intermediate case 16. The left side deck 44 is bolted to the left side wall of the intermediate case 16 together with the main deck 43 via the front and rear spacers 57 so as to position at a vertical intermediate portion of the intermediate case 16. The right side deck 44 is bolted to the right side wall of the intermediate case 16 together with the main deck 43 so as to position at the vertical intermediate portion of the intermediate case 16. With the main deck 43 and the right and left side decks 44 being bolted to the intermediate case 16, predetermined gaps can be secured between the top surface of the intermediate case 16 and the main deck 43 and between the left side surface of the intermediate case 16 and the main deck 43, respectively. The right side deck 44 and the left side deck 44 are positioned at the same level. The main deck 43 has a cutaway portion 58 at a right rear end portion of the top thereof for receiving and removing an oil gauge (not shown) provided on a right rear end upper portion of the intermediate case 16.

Figure 4:
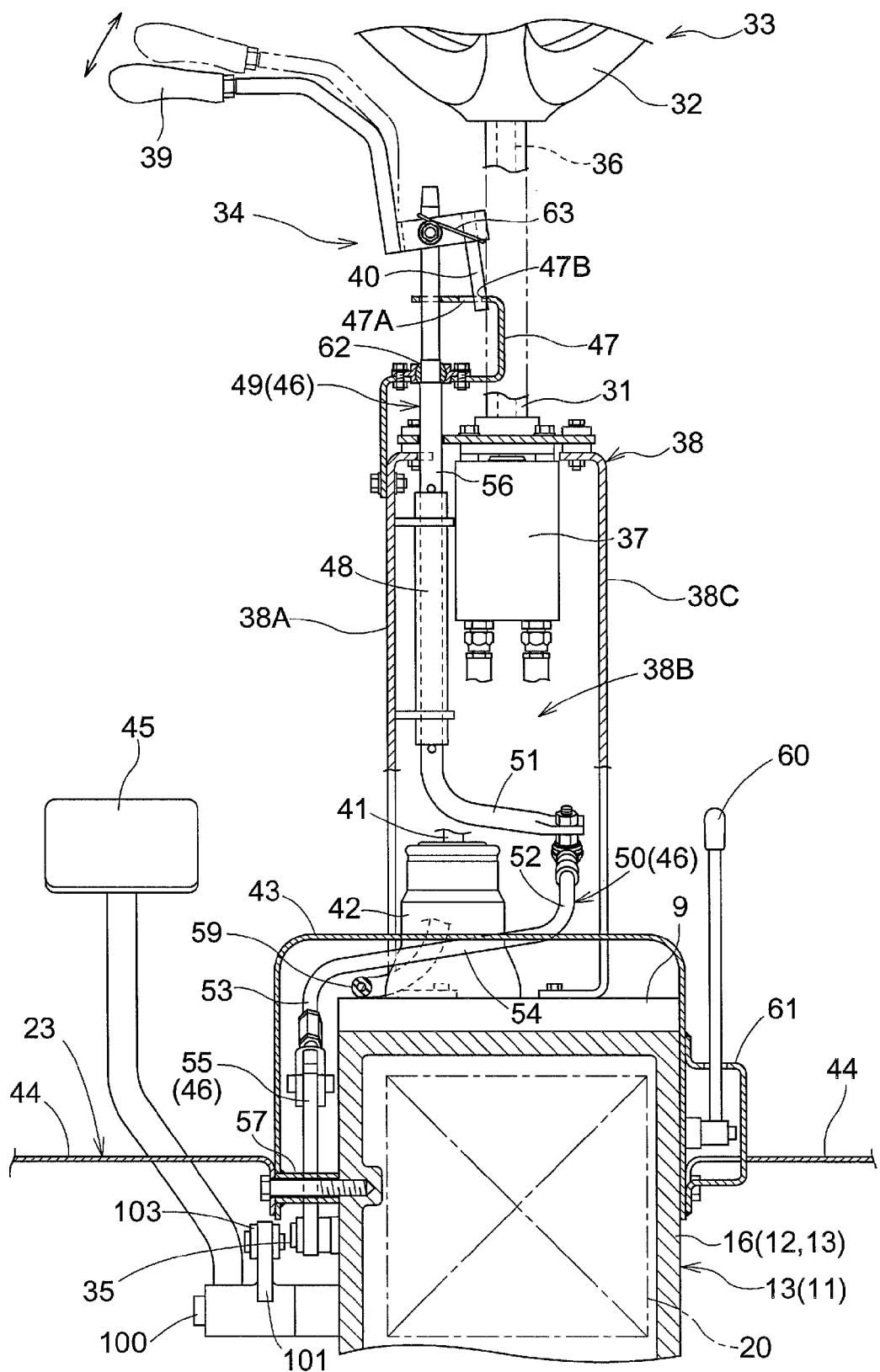
FIG. 4 is a rear view in vertical section of the principal portion including the link mechanism for switching forward/reverse drive.
Figure 5:
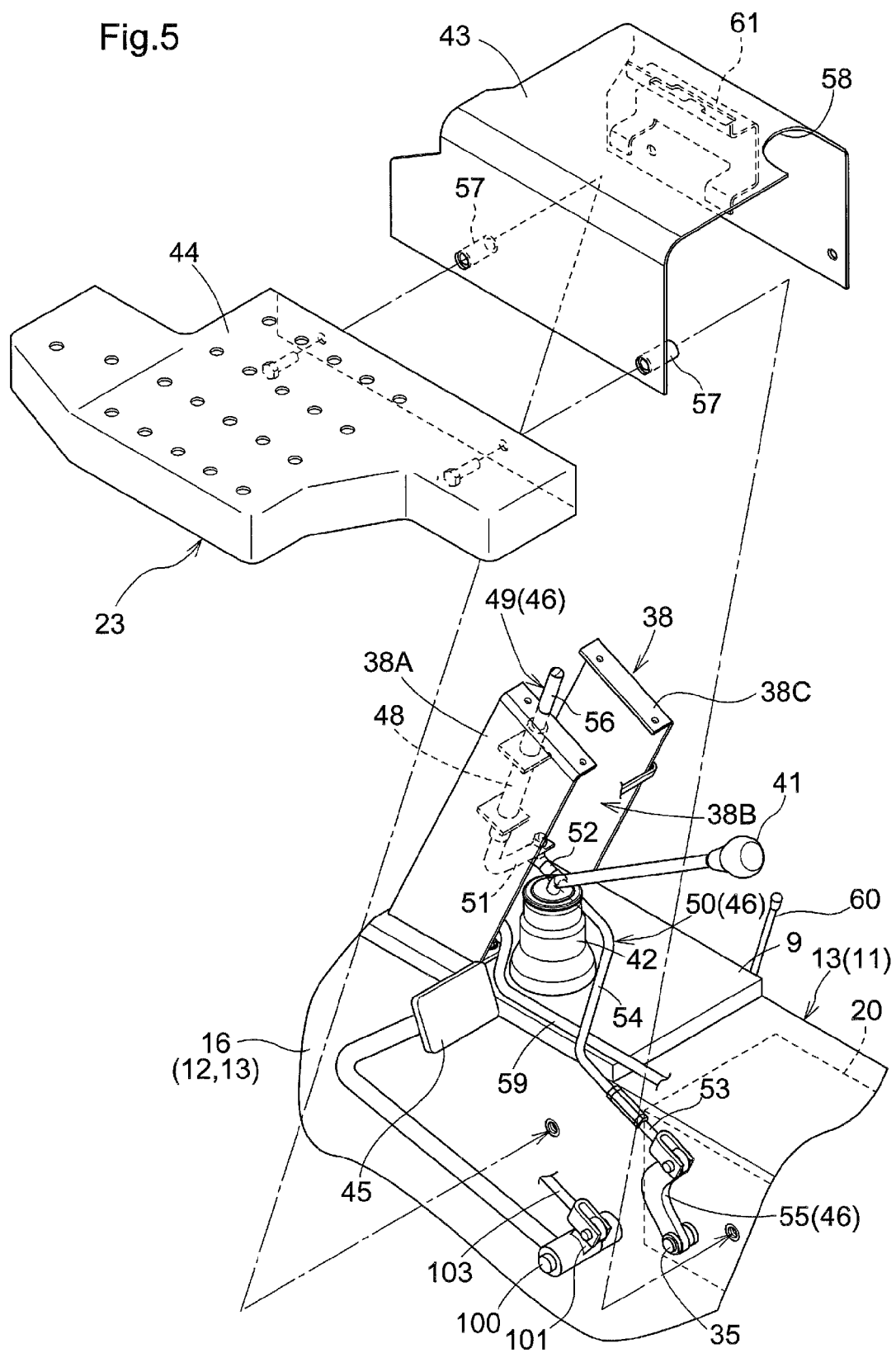
FIG. 5 is an exploded perspective view of the principal portion including the link mechanism for switching forward/reverse drive.

Referring to FIGS. 4 and 5, the support 38 that is generally gate shaped for supporting the steering wheel 32 and the like is open rearward and bolted to a front end portion of the intermediate case 16 positioned forward of the lid 9. The support 38 extends upright from the front part of the housing frame 13 for supporting, in addition to the steering wheel 32, a forward/reverse drive switching lever 39 (an example of a control lever) projecting upward. A tubular shaft support 48 is fixed to an inner surface of a left side wall 38A of the support 38 so as to tilt backward generally along the support 38 and positioned between the left side wall 38A and a control unit 37 of the power steering mechanism. A shaft support element 47 is bolted to an upper end of the left side wall 38A to also act as a guide for the forward/reverse drive switching lever 39.

As illustrated in FIGS. 1 to 6, the forward/reverse drive switching lever 39 is linked to a control shaft 35 (corresponding to an "input section") of the forward/reverse drive switching device 20 extending leftward from a rear portion of the left wall of the intermediate case 16 through a link mechanism 46 for switching forward/reverse drive. In this manner, the control shaft 35 is mounted on a side portion of the housing frame 13 rearward of the support 38, and the link mechanism 46 is configured to connect the forward/reverse drive switching lever 39 to the control shaft 35 so as to input an operational force from the forward/reverse drive switching lever 39 supported to the support 38 to the control shaft 35 disposed rearward of the support 38. The link mechanism 46 includes an L-shaped first link rod 49 (corresponding to a "downward extension"), a cranked second link rod 50 (corresponding to a "rearward extension") of a turnbuckle type that is adjustable in length, and a control arm 55 (corresponding to the "rearward extension") fixed to a projecting end of the control shaft 35 so as to position between the left side surface of the intermediate case 16 and the main deck 43, for example.

Referring to FIGS. 1 to 6, the first link rod 49 has a vertical shaft section 56 that is rotatably fitted into and non-slidably pinned to the shaft support 48 of the support 38. Further, the vertical shaft section 56 has an upper portion extending through bores formed in the support 38 and the shaft support element 47 and rotatably and non-slidably connected to the shaft support element 47 through a bearing. The forward/reverse drive switching lever 39 is connected to an upper end of the vertical shaft section 56 to be vertically pivotable and extend leftward. Further, the first link rod 49 has an arm section 51 extending from a lower end of the vertical shaft section 56 toward the right side wall 38C of the support 38. The second link rod 50 is pivotably connected at a front end thereof to an extending end of the arm section 51. More particularly, the first link rod 49 extends vertically in the interior of the support 38 and is connected to the second link rod 50 at a lower end thereof.

Referring further to FIGS. 1 to 6, the second link rod 50 extends between the arm section 51 of the first link rod 49 and the control arm 55 to tilt backward and downward in a direction perpendicular to the first link rod 49. In that state, the second link rod 50 has a longitudinal front part 52 (corresponding to a "forward region") extending from a rearward hollow part 38B (corresponding to an "opening") defined between the right and left side walls 38C and 38A of the support 38 to pass the right side of the lever support 42 disposed above the intermediate case 16. Further, a diagonal intermediate part 54 (corresponding to a "tilting region" and a "rearward region") passing between the upper surface of the intermediate case 16 and the main deck 43, and a longitudinal rear part 53 (corresponding to the "rearward region") passing between the left side surface of the intermediate case 16 and the main deck 43. In this manner, the second link rod 50 is arranged along the top and the side of the housing frame 13 to be covered by the main deck 43. Since the second link rod 50 extends through the hollow part 38B defined rearward of the support 38 without forming any hole in the support 38, and the connecting part between the first link rod 49 and the second link rod 50 is positioned in the right side above the housing frame 13, the second link rod 50 can extend around the lever support 42 mounted in the left side above the housing frame 13 and thus can be easily disposed. In addition, the second link rod 50 has an increased number of the longitudinally-directed portions each having a simple shape such as the longitudinal front part 52, the intermediate part 54 extending diagonally relative to the fore-and-aft direction, and the longitudinally-directed rearward part 53, which can reduce the dimension from the first link rod 49 to the control shaft 35.

More particularly, the link mechanism 46 for switching the forward/reverse drive can make use of the space secured between the right and left side walls 38C and 38A of the gate-shaped support 38 and the space secured between the intermediate case 16 and the main deck 43 to extend between the forward/reverse drive switching lever 39 and the control shaft 35 of the forward/reverse drive switching device 20.

As shown in FIG. 4, the forward/reverse drive switching lever 39 has a guide rod 40 engaging into a guide hole 47A formed in the shaft support 47 and having an arc shape centering about the vertical shaft section 56 of the first link rod 49. The shaft support 47 has a recess 47B communicating with a longitudinal intermediate portion of the guide hole 47A for allowing the forward/reverse drive switching lever 39 to be maintained in a neutral position thereof by engaging with the guide rod 40. The link mechanism 46 for switching the forward/reverse drive has a torsion spring 63 for urging to engage the guide rod 40 with the recess 47B.

With the above-described arrangement, the forward/reverse drive switching lever 39 is engaged with the recess 47B by the action of the torsion spring 63, thereby to maintain the forward/reverse drive switching lever 39 in the neutral position. As a result, the forward/reverse drive switching device 20 can be maintained in its neutral position to shut off the transmission from the main speed change device 19 to the right and left front wheels 27 and the right and left rear wheels 24. When the forward/reverse drive switching lever 39 is pivotably operated to a direction against the action of the torsion spring 63 (upward) in this state to release the engagement with the recess 47B of the guide rod 40, the forward/reverse drive switching lever 39 can be pivotally operated in a forward/reverse drive switching direction (fore-and-aft direction). Then, the forward/reverse drive switching lever 39 is pivotally operated in the forward/reverse drive switching direction to switch the forward/reverse drive switching device 20 between a forward drive transmission position and a reverse drive transmission position, thereby to switch the traveling state between a forward drive mode and a rearward drive mode.

More particularly, the forward/reverse drive switching lever 39 and the link mechanism 46 for switching the forward/reverse drive constitute a control mechanism 34 for switching the forward/reverse drive for allowing the forward/reverse switching device 20 to be operated from the driver's section 29.

Referring to FIGS. 2, 3 and 5, a wire harness 59 (an example of a "different extending element") extends through the space between the intermediate case 16 and the main deck 43 along with the second link rod 50 of the link mechanism 46 for switching between the forward/reverse drive. The wire harness bundles signal wires for allowing communication between various detectors (not shown) provided in the tractor such as a rotational speed sensor (not shown) for detecting the rotational speed of the engine, a display panel and various setting elements (not shown) mounted on the driver's section 29, and a control unit (not shown) mounted on the tractor, for example. That is, the wire harness 59 extends from the front to the rear of the housing frame 13, independently of the second link rod 50. The wire harness 59 is arranged along the top of the housing frame 13 to be covered by the main deck 43. In such a manner, the space between the intermediate case 16 and the main deck 43 is effectively used as a wiring space for arranging the link mechanism 46 for switching the forward/reverse drive and the wire harness 59.

Referring to FIGS. 1 to 5, a support shaft 100 is mounted in a longitudinal intermediate portion of the left side wall of the intermediate case 16 for vertically pivoting the clutch pedal 45. The clutch pedal 45, as coupled to the support shaft 100, extends from its proximal end at the support shaft 100 forward of the left side deck 44 passing under the left side deck 44, and is bent at a front end portion of the left side deck 44 to extend upward toward its free end. As a result, the clutch pedal 45 has a sideways V shape as viewed from the side. A link arm 101 is integrally formed with a pivotal point portion of the clutch pedal 45, and is linked to a control shaft of the main clutch 18 projecting leftward from a front end portion of the left side wall of the intermediate case 16 through a control arm (not shown) fixed to a projecting end of the control shaft under the left side deck 44 and a link rod 103 extending between the link arm 101 and the control arm under the left side deck 44.

A PTO lever 60 is provided near the lateral center of the vehicle around the foot space in the driver's section 29 to be pivotable in the fore-and-aft direction. The PTO lever 60 is configured to control a PTO clutch in the PTO transmission line 5, and engaged or disengaged with the lever guide 61 of the main deck 43 to be maintained in an engaged position or a disengaged position.

Modifications of First Embodiment

<1> In the above embodiment, the forward/reverse drive switching lever 39 is shown as an example of the control lever. Instead, the control lever may be any other main shift lever or auxiliary shift lever.

<2> In the above embodiment, the main deck 43 is open downward to have an inversed U shape as viewed from the front, in which the entire top surface thereof is positioned above the second link rod 50 of the link mechanism 46. Instead, only a portion of the main deck 43 positioned above the movable part of the link mechanism may bulge upward to cover the link rod, for example.

<3> In the above embodiment, the housing frame element is provided above the housing frame 13. Instead, the housing frame element may be provided in a lateral side of the housing frame 13. Further, while the lever support 42 for supporting the main shift lever 41 is shown as an example of the housing frame element, any other housing frame element may be provided such as an element projecting upward from the top surface of the housing frame 13 or outward from the side surface of the housing frame 13.

<4> In the above embodiment, the wire harness 59 acting as the different extending element is disposed along the top of the housing frame 13 to be covered by the main deck 43. Instead, the wire harness 59 that is an example of the different extending element may be disposed along either one of lateral side surfaces of the housing frame 13 to be covered by the main deck 43. Further, in addition to the wire harness 59, any other extending element such as a wire, a rod and a hose may be provided as the different extending element.

<5> In the above embodiment, the tractor is shown as an example of the work vehicle. Instead, the work vehicle may be any other work vehicle such as a ride-on mower, a ride-on rice-planting machine and a wheel loader.

Second Embodiment

Embodiments of a power transmission apparatus applied to the tractor as an example of the work vehicle according to the present invention will be described hereinafter in reference to the accompanying drawings.

Figure 7:
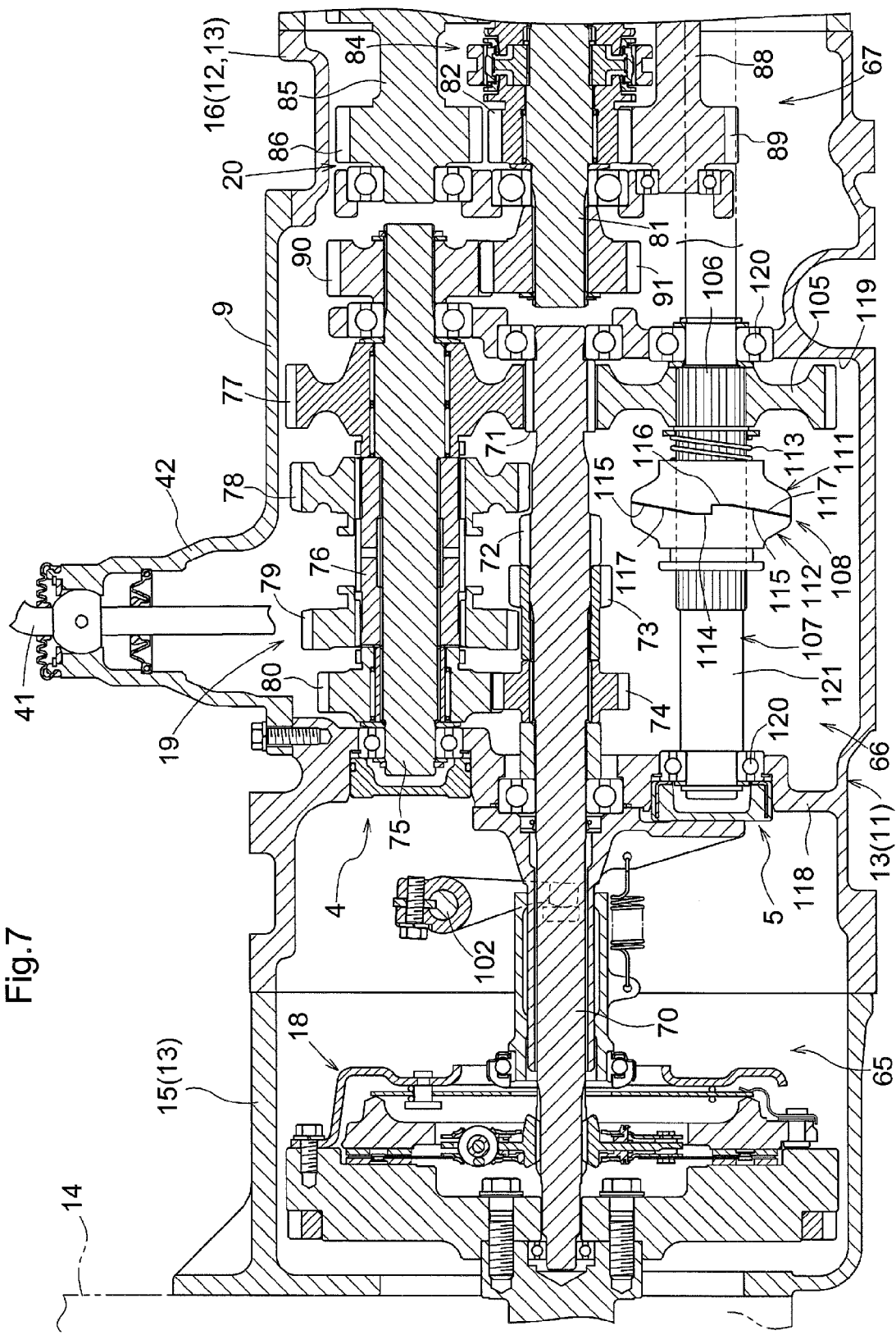
FIG. 7 is a left side view in vertical section of a principal portion including a transmission arrangement in a front half of a transmission case.
Figure 8:
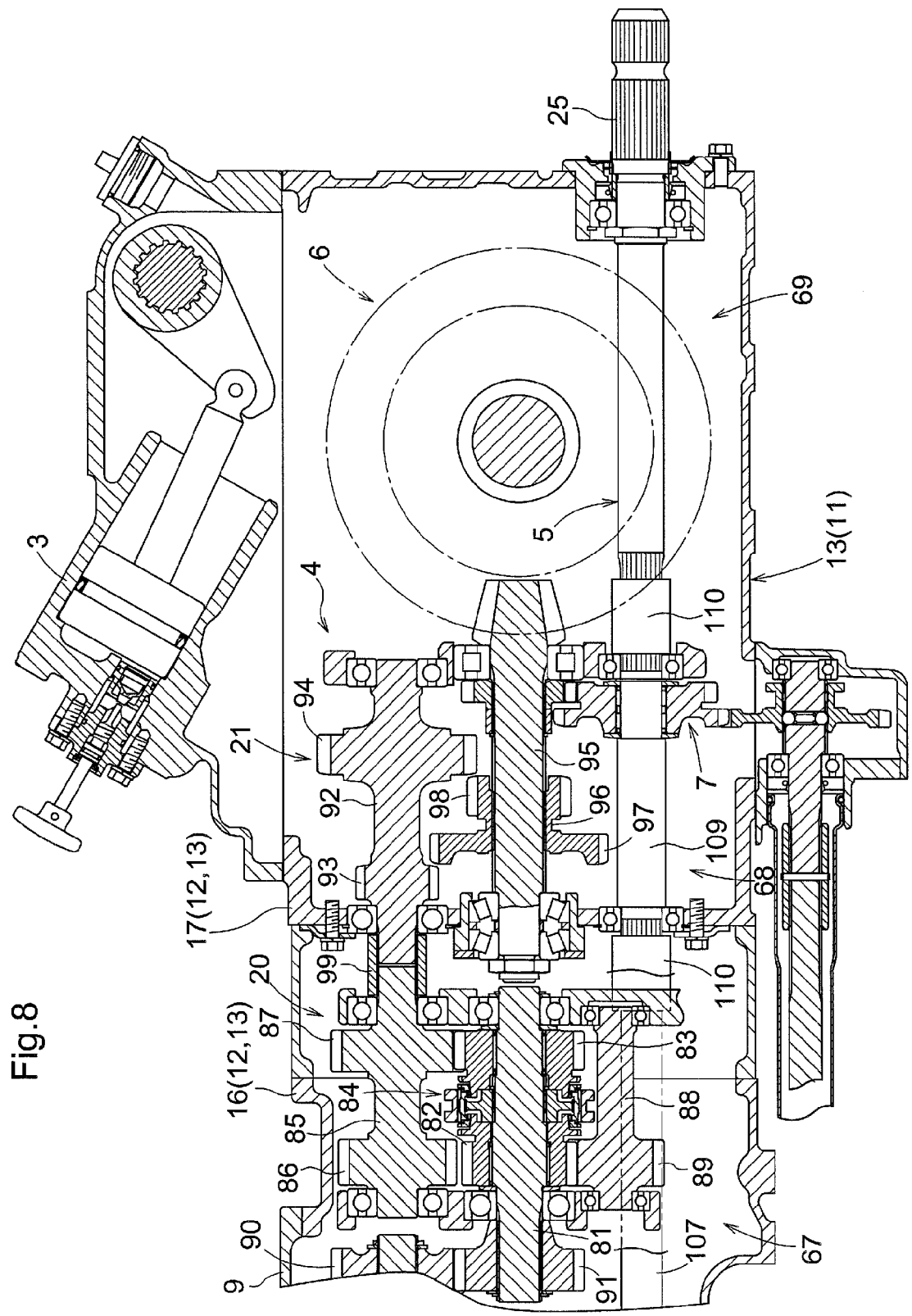
FIG. 8 is a left side view in vertical section of a principal portion including a transmission arrangement in a rear half of a transmission case.

As shown in FIGS. 1, 7 and 8, power from the engine 14 is distributed to the propelling transmission line 4 and the PTO transmission line 5 via the main clutch 18 having a dry-type single plate clutch. Then, propelling power is transmitted to the right and left front wheels 27 and the right and left rear wheels 24 via the propelling transmission line 4. Working power is transmitted to the PTO shaft 25 via the PTO transmission line 5.

The propelling transmission line 4 includes the main speed change device 19 of the sliding-mesh type for shifting power from the engine 14 into four speeds, the forward/reverse drive switching device 20 of the synchromesh type for switching power shifted at the main speed change device 19 between the forward drive and the reverse drive, the auxiliary speed change device 21 of the sliding-mesh type for shifting power switched at the forward/reverse drive switching device 20 into high and low speeds, the rear wheel differential 6 for allowing differential motion of the right and left rear wheels 24 and transmitting power shifted at the auxiliary speed change device 19 to the right and left rear wheels 24, the gear unit 7 for taking power for driving the front wheels from power shifted at the auxiliary speed change device 21, and the front wheel differential 8 for allowing differential motion of the right and left front wheels 27 and transmitting power from the gear unit 7 to the right and left front wheels 27.

Referring to FIGS. 1 to 5, 7 and 8, the main clutch 18 is configured to switch from the engaged position for transmitting power from the engine 14 to the propelling transmission line 4 to the disengaged position for shutting off the power transmission in response to the depression of the clutch pedal 45 provided in the left foot space of the driver's section 29, and switch from the disengaged position to the engaged position in response to release of the depression of the clutch pedal 45.

The main speed change device 19 includes a first transmission shaft 70 also acting as an input shaft of the main speed change device 19, a first drive gear 71 mounted in unison with a rear end portion of the first transmission shaft 70, a second drive gear 72 mounted in unison with the first transmission shaft 70 at a forward position of the first drive gear 71, a third drive gear 73 spline fitted on the first transmission shaft 70 in a forward position of the second drive gear 72, a fourth drive gear 74 spline fitted on the first transmission shaft 70 in a forward position of the third drive gear 73, a second transmission shaft 75 arranged above and parallel with the first transmission shaft 70, a diameter-increasing tubular shaft 76 spline fitted on the second transmission shaft 75, a first driven gear 77 meshed with the first drive gear 71 and fitted on the second transmission shaft 75 to be relatively rotatable, a second driven gear 78 slidably spline fitted on a rear half portion of the tubular shaft 76, a third driven gear 79 slidably spline fitted on a front half portion of the tubular shaft 76, and a fourth driven gear 80 meshed with the fourth drive gear 74 and fitted on the second transmission shaft 75 to be relatively rotatable.

The second driven gear 78 is slidable between a first speed position to spline fitted to the first driven gear 77 and a second speed position to mesh with the second drive gear 72. The third driven gear 79 is slidable between a third speed position to mesh with the third drive gear 73 and a fourth speed position to spline fitted to the fourth driven gear 80. The second driven gear 78 and the third driven gear 79 is switchable, in response to lateral pivotal movement of the main shift lever 41 disposed rearward of the steering post 31 in the driver's section 29, between a first link position in which the second driven gear 78 is linked to the main shift lever 41 and a second link position in which the third driven gear 79 is linked to the main shift lever 41. In the first link position, the second driven gear 78 is slidable between the first speed position and the second speed position in response to pivotal movement of the main shift lever 41 in the fore-and-aft direction. In the second link position, the third driven gear 79 is slidable between the third speed position and the fourth speed position in response to the pivotal movement of the main shift lever 41 in the fore-and-aft direction.

More particularly, the main speed change device 19 is switchable, in response to the pivotal movement of the main shift lever 41, between a first shift position for transmitting power transmitted to the first transmission shaft 70 to the second transmission shaft 75 through the first drive gear 71, the first driven gear 77, the second driven gear 78 and the tubular shaft 76, a second shift position for transmitting power to the second transmission shaft 75 through the second drive gear 72, the second driven gear 78 and the tubular shaft 76, a third shift position for transmitting power to the second transmission shaft 75 through the third drive gear 73, the third driven gear 79 and the tubular shaft 76, and a fourth shift position for transmitting power to the second transmission shaft 75 through the fourth drive gear 74, the fourth driven gear 80, the third driven gear 79 and the tubular shaft 76.

The forward/reverse drive switching device 20 includes a third transmission shaft 81 also acting as an input shaft of the forward/reverse drive switching device 20, a reverse drive gear 82 relatively rotatably fitted on a front part of the third transmission shaft 81, a forward drive gear 83 relatively rotatably fitted on a rear part of the third transmission shaft 81, a synchromesh-type shift mechanism 84 disposed between the reverse drive gear 82 and the forward drive gear 83 in the third transmission shaft 81, a fourth transmission shaft 85 arranged above and parallel with the third transmission shaft 81, a reverse driven gear 86 integrally formed with a front part of the forth transmission shaft 85 adjacent to the reverse drive gear 82, a forward driven gear 87 integrally formed with a rear part of the fourth transmission shaft 85 to mesh with the forward drive gear 83, a reverse drive relay shaft 88 arranged under and parallel with the third transmission shaft 81, and a reverse gear 89 integrally formed with the reverse drive relay shaft 88 to mesh with the reverse drive gear 82 and the reverse driven gear 86.

The third transmission shaft 81 is operatively connected to the second transmission shaft 75 also acting as an output shaft of the main speed change device 19. The shift mechanism 84 is switchable between a position in which the third transmission shaft 81 is operatively connected to the reverse drive gear 82 and a position in which the third transmission shaft 81 is operatively connected to the forward drive gear 83 in response to the longitudinal pivotal movement of the forward/reverse drive switching lever 39 disposed in the left side of the steering post 31 in the driver's section 29.

More particularly, the forward/reverse drive switching mechanism 20 is switchable, in response to the pivotal movement of the forward/reverse drive switching lever 39 in the fore-and-aft direction, between a reverse drive transmission position for transmitting power transmitted to the third transmission shaft 81 to the fourth transmission shaft 85 through the reverse drive gear 82, the reverse gear 89 and the reverse driven gear 86, and a forward drive transmission position for transmitting power transmitted to the third transmission shaft 81 to the fourth transmission shaft 85 through the forward drive gear 83 and the forward driven gear 87.

The auxiliary speed change device 21 includes a fifth transmission shaft 92 also acting as an input shaft of the auxiliary speed change device 21, a low-speed drive gear 93 integrally formed with a front part of the fifth transmission shaft 92, a high-speed drive gear 94 integrally formed with a rear part of the fifth transmission shaft 92, a sixth transmission shaft 95 under and parallel with the fifth transmission shaft 92, a shift element 96 slidably fitted on the sixth transmission shaft 95, a low-speed driven gear 97 integrally formed with a front end portion of the shift element 96 to be meshed with the low-speed drive gear 93, and a high-speed driven gear 98 integrally formed with a rear end portion of the shift element 96 to be meshed with the high-speed drive gear 94.

The fifth transmission shaft 92 is operatively connected to the fourth transmission shaft 85 also acting as an output shaft of the forward/reverse drive switching device 20 through a coupling 99. The shift element 96 is switchable, in response to the longitudinal pivotal movement of the auxiliary shift lever 104 disposed in the left side of the driver's seat 30 in the driver's section 29, between a position in which the low-speed driven gear 97 is meshed with the low-speed drive gear 93 and a position in which the high-speed driven gear 98 is meshed with the high-speed drive gear 94.

More particularly, the auxiliary speed change device 21 is switchable, in response to the pivotal movement of the auxiliary shift lever 104 in the fore-and-aft direction, between a low-speed transmission position for transmitting power transmitted to the fifth transmission shaft 92 to the sixth transmission shaft 95 through the low-speed drive gear 93 and the low-speed driven gear 97, and a high-speed transmission position for transmitting power transmitted to the fifth transmission shaft 92 to the sixth transmission shaft 95 through the high-speed drive gear 94 and the high-speed driven gear 98.

Referring to FIGS. 7 and 8, a main clutch housing space 65 for housing the main clutch 18 is defined in the interior of the housing frame 13 at a position between the front case 15 and the intermediate case 16. Further, a main speed change device housing space 66 for housing the main speed change device 19 acting as a first housing space is defined in the interior of the housing frame 13 at a front part of the intermediate case 16 that is a rearward position of the main clutch housing space 65. Meanwhile, a forward/reverse drive switching device housing space 67 for housing the forward/reverse drive switching device 20 acting as a second housing space is defined in the interior of the housing frame 13 at a rear part of the intermediate case 16 that is a rearward position of the main speed change device housing space 66. In addition, an auxiliary speed change device housing space 68 for housing the auxiliary speed change device 21 is defined in the interior of the housing frame 13 at a front part of the rear case 17 that is a rearward position of the forward/reverse drive switching device housing space 67, and a rear wheel differential housing space 69 for housing the rear wheel differential 6 is defined in the interior of the housing frame 13 at a rear part of the rear case 17 that is a rearward position of the auxiliary speed change device housing space 68.

As shown in FIGS. 1 to 5, 7 and 8, the lid 9 is detachably bolted to the top of the intermediate case 16 for opening the main speed change device housing space 66. The lever support 42 for pivotably supporting the main shift lever 41 is provided to bulge upward from the left front end portion of the lid 9 in the transverse central part of the vehicle.

As illustrated in FIGS. 1 and 7 to 9, the PTO transmission line 5 includes a transmission gear 105 meshed with the first drive gear 71 of the first transmission shaft 70 for taking working power, a tubular shaft 106 spline fitted to the transmission gear 105, a transmission shaft 107 to which the tubular shaft 106 is fitted to be relatively rotatable and non-slidable, a one-way clutch 108 for operatively connecting the tubular shaft 16 to the transmission shaft 107 with the transmission shaft 107 being allowed to rotate ahead of the tubular shaft 106, and a relay shaft 109 and a pair of couplings 110 for operatively connecting the transmission shaft 107 to the PTO shaft 25.

The one-way clutch 108 includes a first claw clutch element 111 slidably spline fitted on the tubular shaft 106, a second claw clutch element 112 slidably spline fitted on the transmission shaft 107, and a compression spring 113 acting as an urging element for returning the first claw clutch element 111 to a meshing position to be in mesh with the second claw clutch element 112 from a meshing-release position to be out of mesh from the second claw clutch element 112.

With the above-described construction, the transmission gear 105, the compression spring 113 and the first claw clutch element 111 are fitted on the tubular shaft 16 to form a unit, which is in turn fitted on the transmission shaft 107 as a drive-side transmission section for the PTO transmission line 5. As a result, the utility in assembling the PTO transmission line 5 can be enhanced.

The first claw clutch element 111 and the second claw clutch element 112 constitute a ride-on cam system in which a riding surface 117 formed on each claw 116 of the second claw clutch element 112 overrides a riding guide surface 115 formed on each claw 114 of the first claw clutch element 111 when a reverse drive state is produced by inertia of the work implement due to deceleration operation during the travel of the work vehicle, thereby to slide and displace the second claw clutch element 112 from the meshing position to the meshing-release position against the action of the compression spring 113 to allow the second claw clutch element 112 to rotate ahead of the first claw clutch element 111.

The above-described arrangement can avoid a disadvantage that the vehicle speed is not lowered due to the rotation of the tubular shaft 106 and the first transmission shaft 70 in the reverse drive state along with the PTO shaft 25 and the transmission shaft 107 by the inertia of the work implement even when the deceleration operation is performed by the acceleration pedal 64 during the travel of the work vehicle with the work implement being actuated with power taken from the PTO shaft, for example.

Referring to FIGS. 1 to 5, the PTO lever 60 is provided near the lateral center of the vehicle around the foot space in the driver's section 29 to be pivotable in the fore-and-aft direction. The PTO lever 60 is configured to be engaged or disengaged with the lever guide 61 of the main deck 43 to be maintained in the engaged position or the disengaged position. The PTO lever 60 is linked to the second claw clutch element 112 of the one-way clutch 108 through a link mechanism (not shown) for transmitting and shutting off PTO power. The second claw clutch element 112 is slidable, in response to the pivotal movement of the PTO lever 60 in the fore-and-aft direction, between an engaged position to allow the meshing with the first claw clutch element 111 and a disengaged position to prevent the meshing with the first claw clutch element 111.

While not shown, the link mechanism for transmitting and shutting off PTO power is configured to link a link arm integrally formed with a pivotal point of the PTO lever 60 to a shift fork engaged with the second claw clutch element 112 through a control arm fixed to a control shaft of the shift fork projecting rightward from a lower portion of the right side wall of the intermediate case 16 and through a link rod extending between the link arm and the control arm.

More particularly, the second claw clutch element 112 of the one-way clutch is switchable between and maintainable in the engaged position (shown in solid line in FIG. 9) and the disengaged position (shown in two-dot chain line in FIG. 9) by the control of the PTO lever 60. As a result, the one-way clutch is allowed to act as the PTO clutch switchable between a transmission state for transmitting power from the engine 14 to the PTO shaft 25 and a shut-off state for shutting off power from the engine 14 to the PTO shaft 25. Compared with a construction having a separated PTO clutch, the above arrangement simplifies the construction of the PTO transmission line 5, enhances the utility in assembling the PTO transmission line 5, and miniaturizes the transmission case 12.

Figure 9:
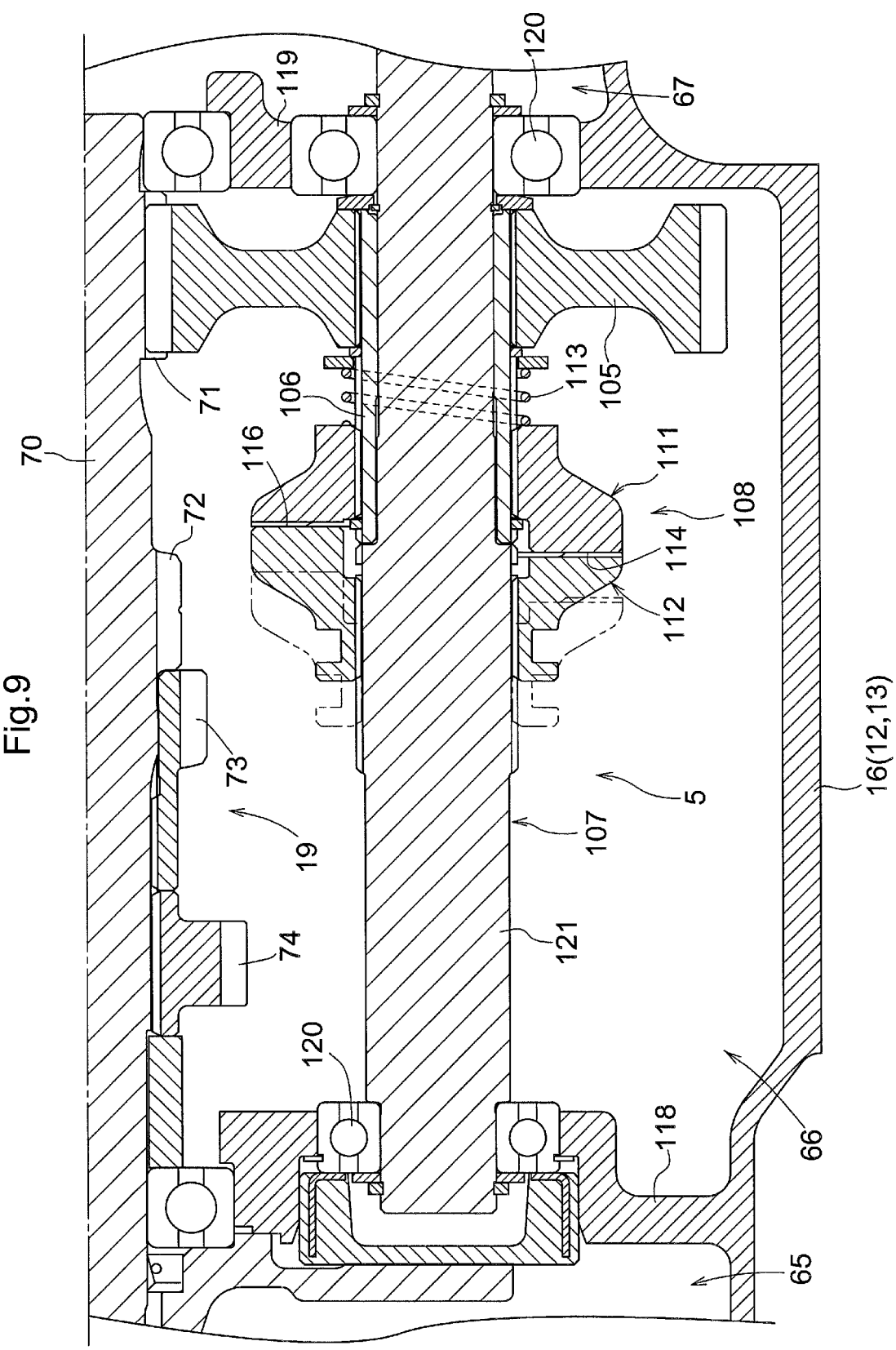
FIG. 9 is a left side view in vertical section of a principal portion of a one-way clutch.

Referring to FIGS. 7 and 9, the transmission shaft 107 of the PTO transmission line 5 is rotatably supported through bearings to a first partition 118 for separating the main clutch housing space 65 from the main speed change device housing space 66, and a second partition 119 for separating the main speed change device housing space 66 from the forward/reverse drive switching device housing space 67. While the tubular shaft 106 and the second claw clutch element 112 are fitted on a both-end support portion 121 of the transmission shaft 107 located between the first partition 118 and the second partition 119, the transmission shaft 105, the first claw clutch element 111 and the compression spring 113 are fitted on the tubular shaft 106, thereby to constitute the one-way clutch 108 on the both-end support portion 121 of the transmission shaft 107. The one-way clutch 108 is disposed in a region below the second drive gear 72 and the third drive gear 73 in the main speed change device housing space 66.

More particularly, compared with an arrangement in which the one-way clutch is disposed to extend between front and rear transmission shafts arranged one behind the other close to each other in the fore-and-aft direction, for example, it is possible in the arrangement in which the one-way clutch 108 is provided in the both-end support portion 121 located between the first partition 118 and the second partition 119 for supporting the single transmission shaft 107 to perform the engaging and disengaging operations of the one-way clutch 108 smoothly and stably for a long period of time while dispensing with a centering process for aligning rotational centers of the front and rear transmission shafts. In addition, it is possible to miniaturize the transmission case 12 and enhance the utility in assembling the PTO transmission line 5, compared with an arrangement in which the one-way clutch 108 is disposed in the forward/reverse drive switching device housing space 67 for housing the forward/reverse drive switching device 20 having a larger number of shafts than the main speed change device 19, and an arrangement in which the one-way clutch 108 is disposed below the fourth driving gear 74 having a larger diameter than the second drive gear 72 and the third drive gear 73.

Modifications of Second Embodiment

<1> The work vehicle may be a ride-on lawn mower, a ride-on rice-planting machine, a wheel loader and the like.

<2> In the PTO transmission line 5, the PTO shaft 25 may response to the vehicle speed (power shifted at the speed change device). Alternatively, the PTO transmission line 5 may have a PTO shaft 25 for responding to the engine speed and a PTO shaft 25 for responding to the vehicle speed.

<3> The one-way clutch 108 may switch the working state as the PTO clutch hydraulically or electrically.

Figure 10:
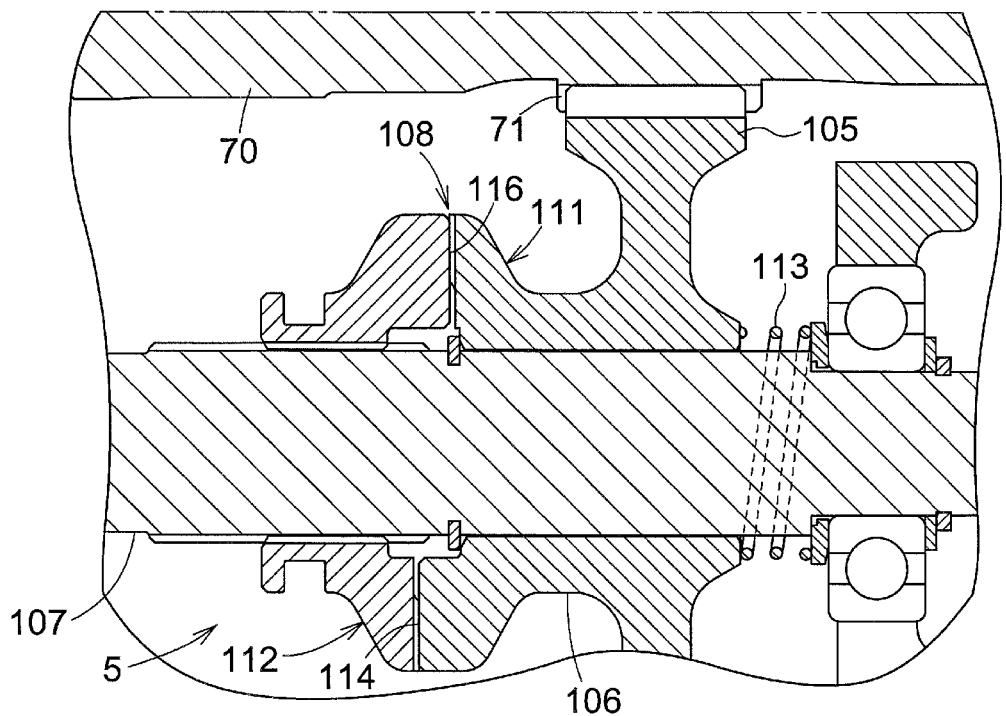
FIG. 10 is a left side view in vertical section of a principal portion of a modification of the one-way clutch.

<4> Referring to FIG. 10, as the one-way clutch 108, the second claw clutch element 112 may be relatively slidably spline fitted on the transmission shaft 107, and the tubular shaft 106 may be fitted on the transmission shaft 107 to be relatively rotatable and relatively slidable. Also, the first claw clutch element 111 and the transmission gear 105 may be integrally formed with the tubular shaft 106, and the compression spring 113 may be fitted on a rear side of the tubular shaft 106 (the opposite side to the second claw clutch element 112 across the tubular shaft 106) in the transmission shaft 107. The second claw clutch element 112 may be linked to the PTO lever 60 thereby to allow the first claw clutch element 111 to be urged to return to the meshing position by the action of the compression spring 113, and allow the second claw clutch element 112 to be switchable between and maintainable in the engaged position and the disengaged position through the control of the PTO lever 60. In such an arrangement, the transmission gear 105 has a large width for maintaining the transmission state regardless of the sliding movement of the first claw clutch element 111 between the meshing position and the meshing-release position.

Figure 11:
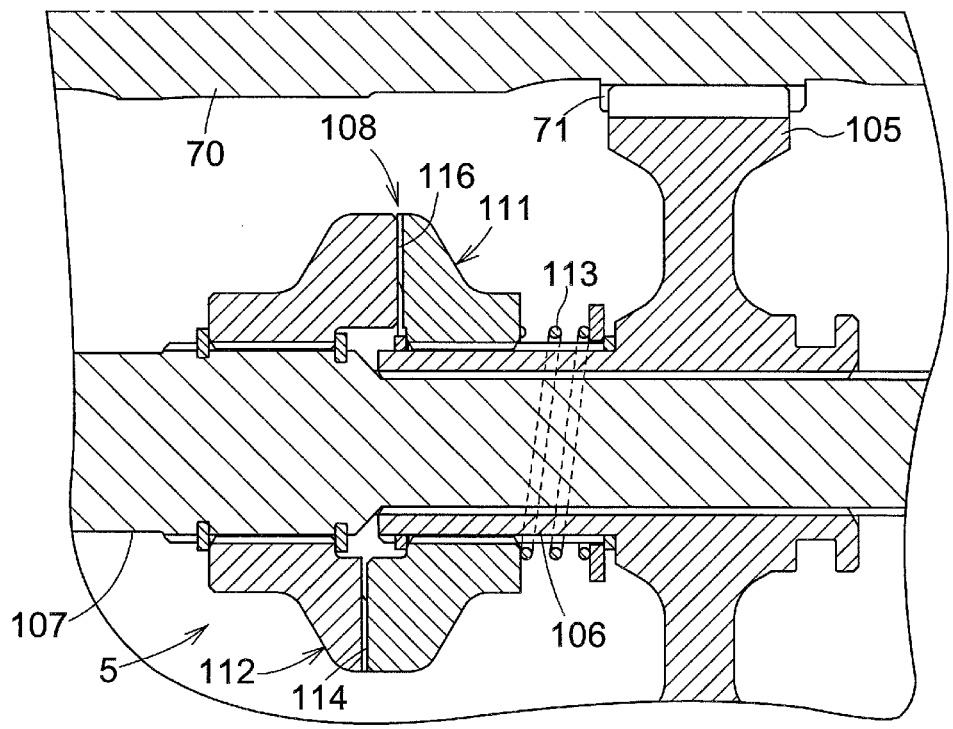
FIG. 11 is a left side view in vertical section of a principal portion of a modification of the one-way clutch.

<5> Referring to FIG. 11, as the one-way clutch 108, the second claw clutch element 112 may be relatively slidably spline fitted on the transmission shaft 107, and the tubular shaft 106 may be fitted on the transmission shaft 107 to be relatively rotatable and relatively slidable. Also, the first claw clutch element 111 may be spline fitted on the tubular shaft 106 to be relatively slidable, and the transmission gear 105 may be integrally formed with and fitted on the tubular shaft 106, with the compression spring 113 being positioned between the first claw clutch element 111 and the transmission gear 105. The tubular shaft 106 may be linked to the PTO lever 60 thereby to allow the first claw clutch element 111 to be urged to return to the meshing position by the action of the compression spring 113, and allow the first claw clutch element 111 to be switchable between and maintainable in the engaged position and the disengaged position through the control of the PTO lever 60. In such an arrangement, the transmission gear 105 has a large width for maintaining the transmission state regardless of the sliding movement of the first claw clutch element 111 between the meshing position and the meshing-release position.

Figure 12:
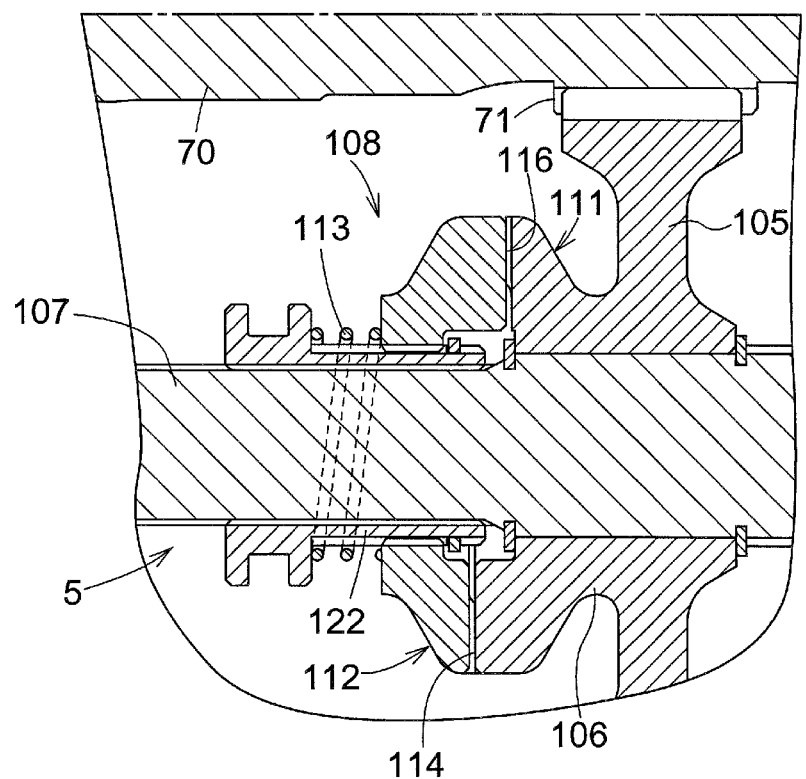
FIG. 12 is a left side view in vertical section of a principal portion of a modification of the one-way clutch.

<6> Referring to FIG. 12, as the one-way clutch 108, the first tubular shaft (tubular shaft 106) with which the transmission gear 105 and the first claw clutch element 111 are integrally formed may be fitted on the transmission shaft 107 to be relatively rotatable and relatively non-slidable, and a second tubular shaft 122 is spline fitted on the transmission shaft 107 to be relatively slidable. Also, the second claw clutch element 112 may be spline fitted on the second tubular shaft 122 to be relatively slidable with the compression spring 113 being fitted on the second tubular shaft 122 in a position between the second claw clutch element 112 and a front end of the second tubular shaft 122. The second tubular shaft 122 may be linked to the PTO lever 60 thereby to allow the second claw clutch element 112 to be urged to return to the meshing position by the compression spring 113, and allow the second claw clutch element 112 to be switchable between and maintainable in the engaged position and the disengaged position through the control of the PTO lever 60.

<7> The one-way clutch may be disposed in the auxiliary speed change device housing space 68.

Third Embodiment

Figure 13:
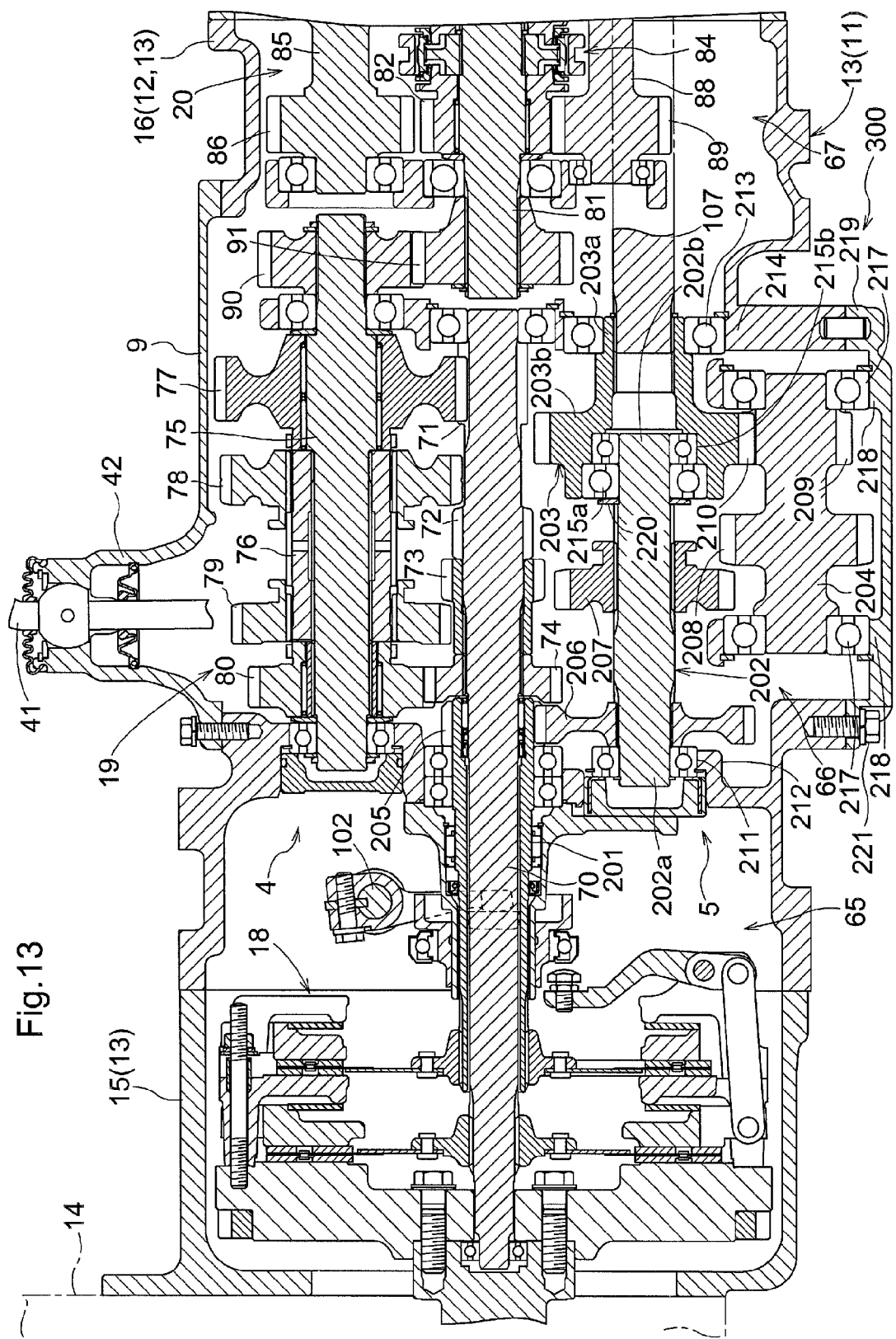
FIG. 13 is a side view in vertical section including a transmission arrangement in the front half of the transmission case.

Referring to FIG. 13, a double-shaft arrangement is employed in which the first transmission shaft 70 in the propelling transmission line 4 is arranged inside and a first tubular transmission shaft 201 in the PTO transmission line 5 is arranged outside. Further, a double-clutch system is employed in which the transmission to the propelling transmission line 4 is shut off by the depression of the clutch pedal 45 to a predetermined position and the transmission to the PTO transmission line 5 is shut off by further depression of the clutch pedal 45 beyond the predetermined position. More particularly, the main clutch 18 is configured to switch from the engaged position for transmitting power from the engine 14 to the first transmission shaft 70 in the propelling transmission line 4 to the disengaged position for shutting off the transmission by depressing the clutch pedal 45 to the predetermined position, and switched from the engaged position for transmitting power from the engine 14 to the first tubular transmission shaft 201 in the PTO transmission line 5 to the disengaged position for shutting off the transmission by depressing the clutch pedal 45 beyond the predetermined position. Further, while the power transmission to the first tubular transmission shaft 201 in the PTO transmission line 5 is switched from the disengaged position to the engaged position by returning the clutch pedal 45 to the predetermined depressing position, the power transmission to the first transmission shaft 70 in the propelling transmission line 4 is switched from the disengaged position to the engaged position by releasing the depression of the clutch pedal 45.

The PTO transmission line 5 according to the third embodiment will be described hereinafter.

Referring to FIGS. 8 and 13, the PTO transmission line 5 includes the first tubular transmission shaft 201, a first interlock shaft 202, a third interlock shaft 204, a second interlock shaft 203, the transmission shaft 107, and the relay shaft 109 arranged from the upstream side of the transmission direction in the mentioned order, thereby to transmit power from the engine 14 to the PTO shaft 25. The PTO transmission line 5 includes an interlock shaft connection device 300 consisting of the first interlock shaft 202 and the second interlock shaft 203. The rotational centers of the first interlock shaft 202, the second interlock shaft 203, the transmission shaft 107 and the relay shaft 109 are aligned. While the first tubular transmission shaft 201 is arranged above and parallel with those shafts 202, 203, 107 and 109, the third interlock shaft 204 is arranged under and parallel with those shafts 202, 203, 107 and 109.

The first tubular transmission shaft 201 and the first transmission shaft 70 constitute the double-shaft arrangement to be relatively rotatable. The first tubular transmission shaft 201 acts as an input shaft for receiving power from the engine 14. A first input gear 206 (acting as a first interlock section) and a first output shaft 207 (acting as the first interlock section and a first interlock gear) are spline fitted on the first interlock shaft 202 to be rotatable in unison. The first input shaft 206 is meshed with an output gear 205 of the first tubular transmission shaft 201, and the first interlock shaft 202 is operatively connected to the first tubular transmission shaft 201. A third interlock gear 208 and a fourth interlock gear 209 are integrally formed with the third interlock shaft 204. The third interlock gear 208 is freely meshed with the first output gear 207 of the first interlock shaft 202, and the third interlock shaft 204 is operatively connectable to the first interlock shaft 202. A second input gear 210 (acting as a second interlock section and a second interlock gear) are integrally formed with the second interlock shaft 203. The second input gear 210 is meshed with the fourth interlock gear 209 of the third interlock shaft 204, and the second interlock shaft 203 is operatively connected to the third interlock shaft 204. The transmission shaft 107 is spline fitted to the second interlock shaft 203 and is operatively connected to the second interlock shaft 203. The relay shaft 109 is operatively connected to the transmission shaft 107 through the couplings 110, and the PTO shaft 25 is operatively connected to the relay shaft 109 through the couplings 110.

A support structure for the first interlock shaft 202, the second interlock shaft 203, and the third interlock shaft 204 will be described hereinafter.

Figure 14:
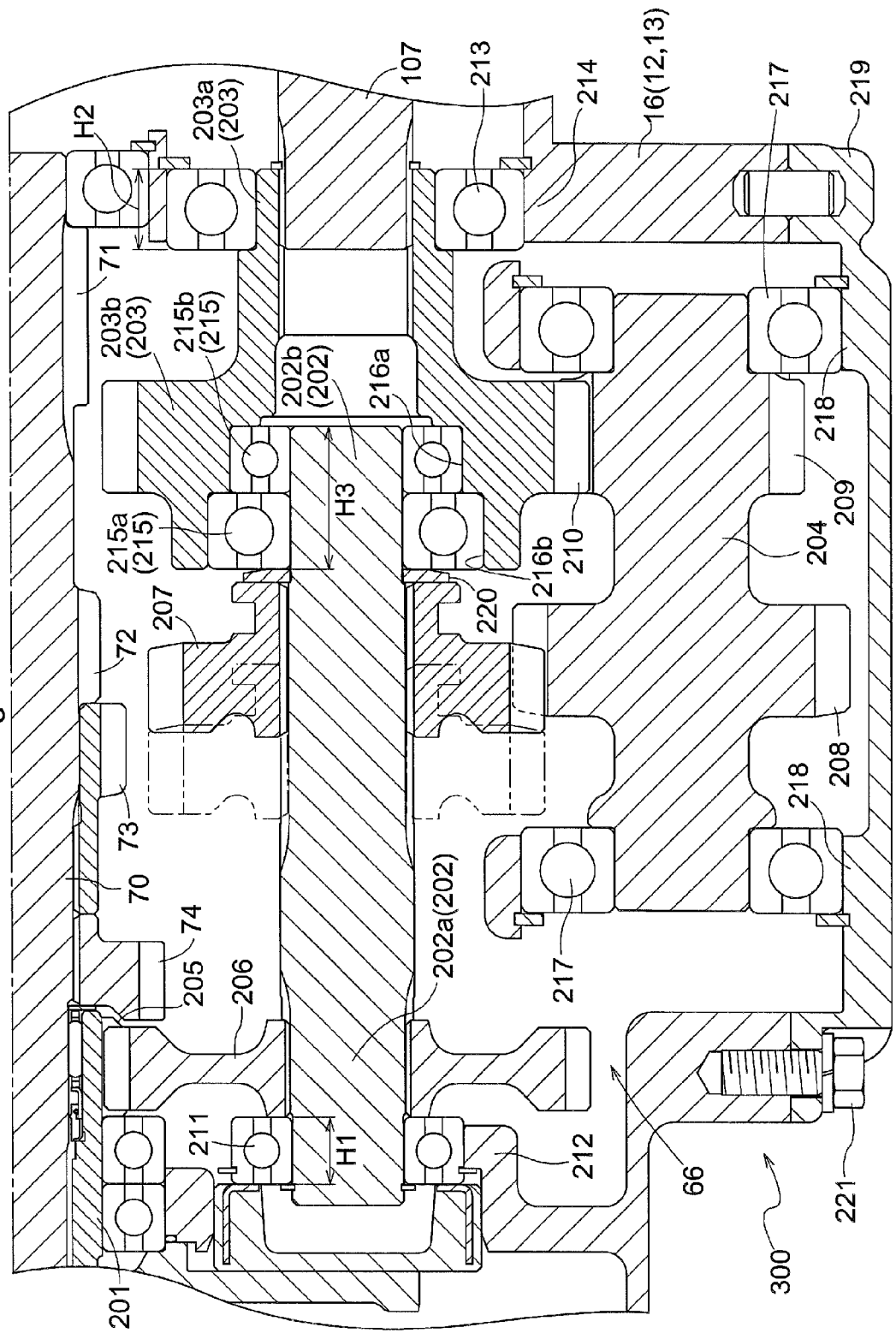
FIG. 14 is an enlarged view of a first interlock shaft and a second interlock shaft in FIG. 13.

Referring to FIG. 14, the first interlock shaft 202 is formed as a rod having a first supported end 202a supported by a first shaft support 212 through a first bearing element 211 at one end of the shaft, and a first non-supported end 202b positioned opposite to the first supported end 202a at the other end of the shaft. The first input gear 206 is arranged in the vicinity of the first supported end 202a in the axial direction of the first interlock shaft 202 to support the first interlock shaft 202 near a portion that receives a reaction force from the first input gear 206 through the first bearing 211. The second interlock shaft 203 is formed as a tube having a second supported end 203a supported by a second shaft support 214 through a second bearing element 213 at one end of the shaft, and a second non-supported end 203b positioned opposite to the second supported end 203a at the other end of the shaft.

The rod-shaped first non-supported end 202b is inserted into and fitted into the tubular second non-supported end 203b. A third bearing element 215 is disposed radially between the first non-supported end 202b and the second non-supported end 203b to allow those ends to support with each other and to be relatively rotatable. More particularly, the third bearing element 215 is fitted on the first non-supported end 202b and fitted into the second non-supported end 203b. As a result, while the first non-supported end 202b supports the second non-supported end 203b radially from the inside, the second non-supported end 203b supports the first non-supported end 202b radially from the outside, thereby to allow the mutual support between those ends.

The third bearing element 215 has a shaft receiving width H3 in the axial direction of the first interlock shaft 202 and the second interlock shaft 203 greater than a shaft receiving width H1 of the first bearing 211 and a shaft receiving width H2 of the second bearing element 213. As a result, the shaft receiving width H3 of the third bearing element 215 can be greater to allow the first non-supported end 202b and the second non-supported end 203b to be mutually supported stably. The third bearing element 215 has a large-diameter bearing 215a and a small-diameter bearing 215b. The second non-supported end 203b of the second interlock shaft 203 has two different fitting portions, that is, a first fitting portion 216a to which the small-diameter bearing 215b fitted on the first non-supported end 202b of the first interlock shaft 202 is fitted, and a second fitting portion 216b to which the large-diameter bearing 215a fitted on the first non-supported end 202b of the first interlock shaft 202 is fitted. The large-diameter bearing 215a and the small-diameter bearing 215b are arranged adjacent to each other in the axial direction of the first interlock shaft 202 and the second interlock shaft 203 with the large-diameter bearing 215a being positioned closer to the first interlock shaft 202.

The second input gear 210 of the second interlock shaft 203 lies over the small-diameter bearing 215b in the axial direction of the first interlock shaft 202 and the second interlock shaft 203, which can miniaturize the second interlock shaft 203 by reducing the axial dimension thereof. Also, since the second input gear 210 is provided radially outward of the small-diameter bearing 215b, the second input gear 210 can have a sufficient thickness in the radial direction and the shaft receiving width H3 of the third bearing element 215 in the axial direction can be greater.

A movement limiting element 220 is provided in the first non-supported end 202b of the first interlock shaft 202 to come into contact with the large-diameter bearing 215a to restrict the large-diameter bearing 215a and the small-diameter bearing 215b from shifting toward the first interlock shaft 202 in the axial direction of the first interlock shaft 202 and the second interlock shaft 203. Meanwhile, the small-diameter bearing 215b comes into contact with a wall of the first fitting portion 216a in the axial direction, thereby to restrict the large-diameter bearing 215a and the small-diameter bearing 215b from shifting toward the second interlock shaft 203 in the axial direction of the first interlock shaft 202 and the second interlock shaft 203.

A distance from a supporting position in which the second supported end 203a is supported by the second bearing element 213 to a supporting position in which the second non-supported end 203b is supported by the third bearing element 215 in the second interlock shaft 203 is smaller than a distance from a supporting position in which the first supported end 202a is supported by the first bearing element 211 to a supporting position in which the first non-supported end 202b is supported by the third bearing element 215 in the first interlock shaft 202. In short, the second interlock shaft 203 is shorter than the first interlock shaft 202.

The third interlock shaft 204 is rotatably supported to third shaft support portions 218 through a fourth bearing element 217 at axial opposite ends thereof. A support element 219 is provided to rotatably support the third interlock shaft 204 with the third shaft support portions 218. The support element 219 is detachably attached to the intermediate case 16 to open and close the intermediate case 16 housing the first interlock shaft 202 and the second interlock shaft 203. The support element 219 is attachable to the intermediate case 16 by fastening a bolt 221 thereto. The fastening direction is perpendicular to the axial direction of the first interlock shaft 202 and the second interlock shaft 203. As a result, the support element 219 can be attached so that the first output gear 207 of the first interlock shaft 202 is properly meshed with the third interlock gear 208 of the third interlock shaft 204, and the second input gear 210 of the second interlock shaft 203 is properly meshed with the fourth interlock gear 209 of the third interlock shaft 204.

The first output gear 207 is fitted on the first interlock shaft 202 in an intermediate portion between the first supported end 202a and the first non-supported end 202b to be slidable between an meshing position (shown in solid line in FIG. 8) to be in mesh with the third interlock gear 208 and a meshing-release position (shown in two-dot chain line in FIG. 14) to be out of mesh from the third interlock gear 208. The first output gear 207 is configured to be slidable to the meshing position or the meshing-release position by the pivotal movement of the PTO lever 60.

Referring to FIGS. 1 to 5, the PTO lever 60 is provided near the lateral center of the foot space in the driver's section 29 to be pivotable in the fore-and-aft direction. The PTO lever 60 is configured to be engaged or disengaged with the lever guide 61 of the main deck 43 to be maintained in the engaged position or the disengaged position. The PTO lever 60 is linked to the first output gear 207 of the first interlock shaft 202 through the link mechanism (not shown) for transmitting and shutting off PTO power. The first output gear 207 is slidable, in response to the pivotal movement of the PTO lever 60 in the fore-and-aft direction, between a meshing position to be in mesh with the third interlock gear 208 and a meshing-release position to be out of mesh from the third interlock gear 208.

While not shown, the link mechanism for transmitting and shutting off PTO power is configured to link a link arm integrally formed with the pivotal point of the PTO lever 60 to a shift fork engaged with the first output gear 207 through the control arm fixed to the control shaft of the shift fork projecting rightward from the lower portion of the right side wall of the intermediate case 16 and through the link rod extending between the link arm and the control arm.

More particularly, the first output gear 207 is switchable between and maintainable in the meshing position (shown in solid line in FIG. 14) and the meshing-release position (shown in two-dot chain line in FIG. 14) by the control of the PTO lever 60. As a result, the first output gear 207 can be act as the PTO clutch switchable between the transmission state for transmitting power from the engine 14 to the PTO shaft 25 and the shut-off state for shutting off power from the engine 14 to the PTO shaft 25.

The first supported end 202a of the first interlock shaft 202 is rotatably supported to the first shaft support element 212 acting as the first partition separating the main clutch housing space 65 from the main speed change device housing space 66 through the first bearing element 211 in the transmission case 12. Meanwhile, the second supported end 203a of the second interlock shaft 203 is rotatably supported to the second shaft support element 214 acting as the second partition separating the main speed change device housing space 66 from the forward/reverse drive switching device housing space 67 through the second bearing element 213 in the transmission case 12. In this manner, the main speed change device housing space 66 for housing the main speed change device 19 and the forward/reverse drive switching device housing space 67 for housing the forward/reverse drive switching device 20 are arranged one behind the other in the fore-and-aft direction, and the interlock shaft connection device 300 consisting of the first interlock shaft 202 and the second interlock shaft 203 is housed in the main speed change device housing space 66.

Modifications of Third Embodiment

<1> In the above embodiment, the first interlock shaft 202 has a rod shape as a whole and the second interlock shaft 203 has a tubular shape as a whole, as a result of which the first non-supported end 202b is rod-shaped and the second non-supported end 203b is tubular. Instead, only the first non-supported end 202b in the first interlock shaft 202 may be rod-shaped and only the second non-supported end 203b in the second interlock shaft 203 may be tubular.

<2> In the above embodiment, the large-diameter bearing 215a and the small-diameter bearing 215b are provided as the third bearing element 215. Instead, two bearings having the same outer diameter may be provided as the third bearing element 215. In addition, the number of bearings as the third bearing element 215 is not limited to two, but may be one, three or more.

<3> In the above embodiment, the third interlock shaft 204 is provided in addition to the first interlock shaft 202 and the second interlock shaft 203. On the other hand, the third interlock shaft 204 is dispensable.

<4> In the above embodiment, power is transmitted to the first interlock shaft 202, the third interlock shaft 204 and the second interlock shaft 203 in the mentioned order. Instead, power may be transmitted in the reverse order to the second interlock shaft 203, the third interlock shaft 204 and the first interlock shaft 202. Further, when the third interlock shaft 204 is not provided as in the above modification <3>, a power transmission line through the first interlock shaft 202 and a power transmission line through the second interlock shaft 203 may be provided separately.

<5> In the above embodiment, the PTO transmission line 5 includes the first interlock shaft 202 and the second interlock shaft 203. Instead, the first interlock shaft and the second interlock shaft may be provided in the propelling transmission line 4, for example. On which power transmission line the first interlock shaft or the second interlock shaft is mounted may be desirably selected.

<6> In the above embodiment, the work vehicle is not limited to the tractor, but may be a ride-on lawn mower, a ride-on rice-planting machine or a wheel loader.

What is claimed is:

1. A power transmission apparatus for a work vehicle, comprising:
   a speed change device for shifting power from an engine and transmitting the power to a propelling line;
   a forward/reverse drive switching device for switching power from the engine between forward drive and reverse drive;

a PTO shaft for taking off working power;
a working transmission line for transmitting power from the engine to the PTO shaft;
a clutch element for establishing and breaking power transmission from the engine to the PTO shaft; and
a transmission case including a first housing space for housing the speed change device, and a second housing space defined rearward of the first housing space for housing the forward/reverse drive switching device,
wherein the clutch element is housed in the first housing space.

2. The power transmission apparatus according to claim 1, wherein the clutch element also acts as a one-way clutch for allowing prior rotation of a driven element,
the one-way clutch includes a first claw clutch element, a second claw clutch element, and an urging element for urging to return one of the first and second claw clutch elements from a meshing-release position to be out of mesh from the other of the first and second claw clutch elements to a meshing position to be in mesh with the other of the first and second claw clutch elements,
the one-way clutch is switchable between and maintainable in an engaged position for allowing one of the first and second claw clutch elements to be in mesh with the other of the first and second claw clutch elements and a disengaged position for preventing the one of the first and second claw clutch elements to be out of mesh from the other of the first and second claw clutch elements,
a tubular shaft is fitted on a transmission shaft to be relatively rotatable; and
one of the first and second claw clutch elements is provided on the transmission shaft and the other of the first and second claw clutch elements is provided on the tubular shaft, thereby to allow the one-way clutch to be mounted on the single transmission shaft.

3. The power transmission apparatus according to claim 2, wherein a transmission gear for taking off working power is mounted on the tubular shaft to be rotatable in unison.

4. The power transmission apparatus according to claim 3, wherein the second claw clutch element is relatively slidably fitted on the transmission shaft to be rotatable in unison, and the tubular shaft is fitted on the transmission shaft to be relatively non-slidable,
the first claw clutch element is relatively slidably fitted on the tubular shaft to be rotatable in unison, and the transmission gear is fitted on the tubular shaft to be relatively non-slidable,
the urging element is a compression spring that is fitted on the tubular shaft between the first claw clutch element and the transmission gear,
the first claw clutch element is configured to be urged to return to the meshing position by the action of the compression spring, and the second claw clutch element is switchable between and maintainable in the engaged position and the disengaged position.

5. The power transmission apparatus according to claim 3, wherein the second claw clutch element is relatively slidably fitted on the transmission shaft to be rotatable in unison, and the tubular shaft is fitted on the transmission shaft to be relatively slidable,
the first claw clutch element is integrally formed with the transmission gear,
the urging element is a compression spring that is fitted on the transmission shaft at a position opposite to the second claw clutch element across the tubular shaft,
the first claw clutch element is configured to be urged to return to the meshing position by the action of the compression spring, and the second claw clutch element is switchable between and maintainable in the engaged position and the disengaged position, and
the transmission gear is configured to maintain a transmission state regardless of whether or not the first claw clutch element slides between the meshing position and the meshing-release position.

6. The power transmission apparatus according to claim 3, wherein the second claw clutch element is relatively non-slidably fitted on the transmission shaft to be rotatable in unison, and the tubular shaft is fitted on the transmission shaft to be relatively slidable,
the first claw clutch element is relatively slidably fitted on the tubular shaft to be rotatable in unison, and the transmission shaft is integrally formed with the tubular shaft,
the urging element is a compression spring that is fitted on the tubular shaft between the first claw clutch element and the transmission gear,
the first claw clutch element is configured to be urged to return to the meshing position by the action of the compression spring, and the first claw clutch element is switchable between and maintainable in the engaged position and the disengaged position, and
the transmission gear is configured to maintain a transmission state regardless of whether or not the first claw clutch element slides between the engaged position and the disengaged position.

7. The power transmission apparatus according to claim 1, wherein the working transmission line includes a first interlock shaft having a first interlock section for operative connection, and a second interlock shaft having a second interlock section for operative connection,
the first interlock shaft and the second interlock shaft are arranged with their rotational centers being aligned,
the first interlock shaft has a first supported end supported to a first shaft support through a first bearing element, and a first non-supported end positioned opposite to the first supported end,
the second interlock shaft has a second supported end supported to a second shaft support through a second bearing element, and a second non-supported end positioned opposite to the second supported end, and
the first non-supported end having a rod shape is inserted into the second non-supported end having a tubular shape through a third bearing element disposed radially between the first non-supported end and the second non-supported end to allow those ends to support with each other and to be relatively rotatable.

8. The power transmission apparatus according to claim 7, wherein the working transmission line further includes a third interlock shaft arranged parallel with the first interlock shaft and the second interlock shaft, the third interlock shaft having axial opposite ends rotatably supported to third shaft supports through a fourth bearing element, and
the third interlock shaft is provided with a third interlock gear freely meshed with a first interlock gear acting as the first interlock section in the first interlock shaft, and a fourth interlock gear freely meshed with a second interlock gear acting as the second interlock section in the second interlock shaft.

9. The power transmission apparatus according to claim 7, wherein the first interlock shaft and the second interlock shaft are housed in the first housing space, and the clutch element is mounted on the first interlock shaft.

* * * * *